(12) United States Patent
Niichel

(10) Patent No.: US 9,346,184 B2
(45) Date of Patent: May 24, 2016

(54) SAFETY DEVICE FOR POWER CUTTING TOOLS

(71) Applicant: William Niichel, Pueblo West, CO (US)

(72) Inventor: William Niichel, Pueblo West, CO (US)

(*) Notice: Subject to any disclaimer, the term of this patent is extended or adjusted under 35 U.S.C. 154(b) by 0 days.

(21) Appl. No.: 14/070,117

(22) Filed: Nov. 1, 2013

(65) Prior Publication Data

US 2014/0116219 A1    May 1, 2014

Related U.S. Application Data

(63) Continuation-in-part of application No. 13/295,813, filed on Nov. 14, 2011, now abandoned.

(60) Provisional application No. 61/721,390, filed on Nov. 1, 2012, provisional application No. 61/413,283, filed on Nov. 12, 2010, provisional application No. 61/431,275, filed on Jan. 10, 2011, provisional application No. 61/533,663, filed on Sep. 12, 2011.

(51) Int. Cl.
| | |
|---|---|
| *B27G 19/02* | (2006.01) |
| *B26D 7/22* | (2006.01) |
| *B23D 59/00* | (2006.01) |
| *B27B 25/10* | (2006.01) |

(52) U.S. Cl.
CPC .............. *B27G 19/02* (2013.01); *B23D 59/00* (2013.01); *B26D 7/22* (2013.01); *B27B 25/10* (2013.01); *Y10T 29/49716* (2015.01); *Y10T 83/744* (2015.04); *Y10T 83/747* (2015.04)

(58) Field of Classification Search
CPC ........ B23Q 3/002; B27G 19/00; B27G 19/02; B27G 21/00; B26D 7/22; B23D 59/00
USPC ........ 83/477, 471, 472, 477.2, 582, 574, 446, 83/451, 448, 450; 30/375; 29/401.1; 144/253.6
See application file for complete search history.

(56) References Cited

U.S. PATENT DOCUMENTS

| | | |
|---|---|---|
| 13,354 A | 7/1855 | Hull |
| 2,522,965 A | 9/1950 | Schaufelberger |
| 2,711,020 A | 6/1955 | Hastings |

(Continued)

OTHER PUBLICATIONS

Restriction Requirement for U.S. Appl. No. 13/295,813, mailed Nov. 19, 2013 7 pages.

(Continued)

*Primary Examiner* — Ghassem Alie
(74) *Attorney, Agent, or Firm* — Sheridan Ross P.C.

(57) ABSTRACT

A system of safety devices is disclosed for use in connection with powered cutting tools, including but not limited to table saws, miter saws, jointers, shapers and routers. The devices include a right hand push device adapted to slide along the fence of a table saw, shaper, router or jointer, a dual bearing hold down device to secure a work piece in at least three directions and adapted for use with a table saw, shaper, router or jointer, an anti-kickback device to secure a work piece after a cut is made and while cutting continues and adapted for use with a table saw, shaper, router or jointer, a left hand hold down device for securing a work piece on the side of a cutting blade opposite that of a fence and adapted for use with a table saw, shaper, router or jointer, and a hold down device adapted for use with miter saws. Each of the devices, alone and in combination, protect the operator of the power tools from serious injury from the cutting tool and from work piece kickback.

22 Claims, 21 Drawing Sheets

(56) References Cited

U.S. PATENT DOCUMENTS

| | | | |
|---|---|---|---|
| 2,722,247 A | | 11/1955 | Schroeder et al. |
| 3,101,104 A | | 8/1963 | Sullivan |
| 3,738,403 A | | 6/1973 | Schwoch et al. |
| 4,026,173 A | * | 5/1977 | Livick .............................. 83/421 |
| 4,469,318 A | | 9/1984 | Slavic |
| 4,485,711 A | | 12/1984 | Schnell |
| 4,603,612 A | | 8/1986 | Atkins |
| 4,976,298 A | | 12/1990 | Gibson |
| 5,058,474 A | | 10/1991 | Herrera |
| 5,148,846 A | | 9/1992 | Van Gelder |
| 5,341,711 A | | 8/1994 | Stay, Jr. et al. |
| 5,595,102 A | | 1/1997 | O'Grady |
| 7,140,286 B2 | * | 11/2006 | Schwartz ........................ 83/446 |
| 7,341,081 B1 | * | 3/2008 | Villiger ...................... 144/253.8 |
| 7,730,914 B2 | * | 6/2010 | Lin ............................ 144/242.1 |
| 8,371,198 B2 | | 2/2013 | Babine |
| 8,826,788 B2 | | 9/2014 | Rybka |
| 2002/0029822 A1 | * | 3/2002 | Jukoff ........................ 144/253.6 |
| 2006/0201297 A1 | | 9/2006 | Friend |
| 2006/0288835 A1 | | 12/2006 | Gregoire |
| 2012/0031247 A1 | | 2/2012 | Wang |
| 2012/0118120 A1 | | 5/2012 | Niichel |
| 2013/0048149 A1 | | 2/2013 | Liu |
| 2015/0183123 A1 | | 7/2015 | Niichel |

OTHER PUBLICATIONS

Official Action for U.S. Appl. No. 13/295,813, mailed Apr. 1, 2014 9 pages.

Final Action for U.S. Appl. No. 13/295,813, mailed Aug. 13, 2014 10 pages.

"Sawing Small Pieces Safely," Popular Science, Jul 1947, vol. 151, No. 1, p. 198.

Official Action for U.S. Appl. No. 14/582,893, mailed Jun. 24, 2015, 16 pages.

Final Action for U.S. Appl. No. 14/582,893, mailed Oct. 15, 2015, 28 pages.

* cited by examiner

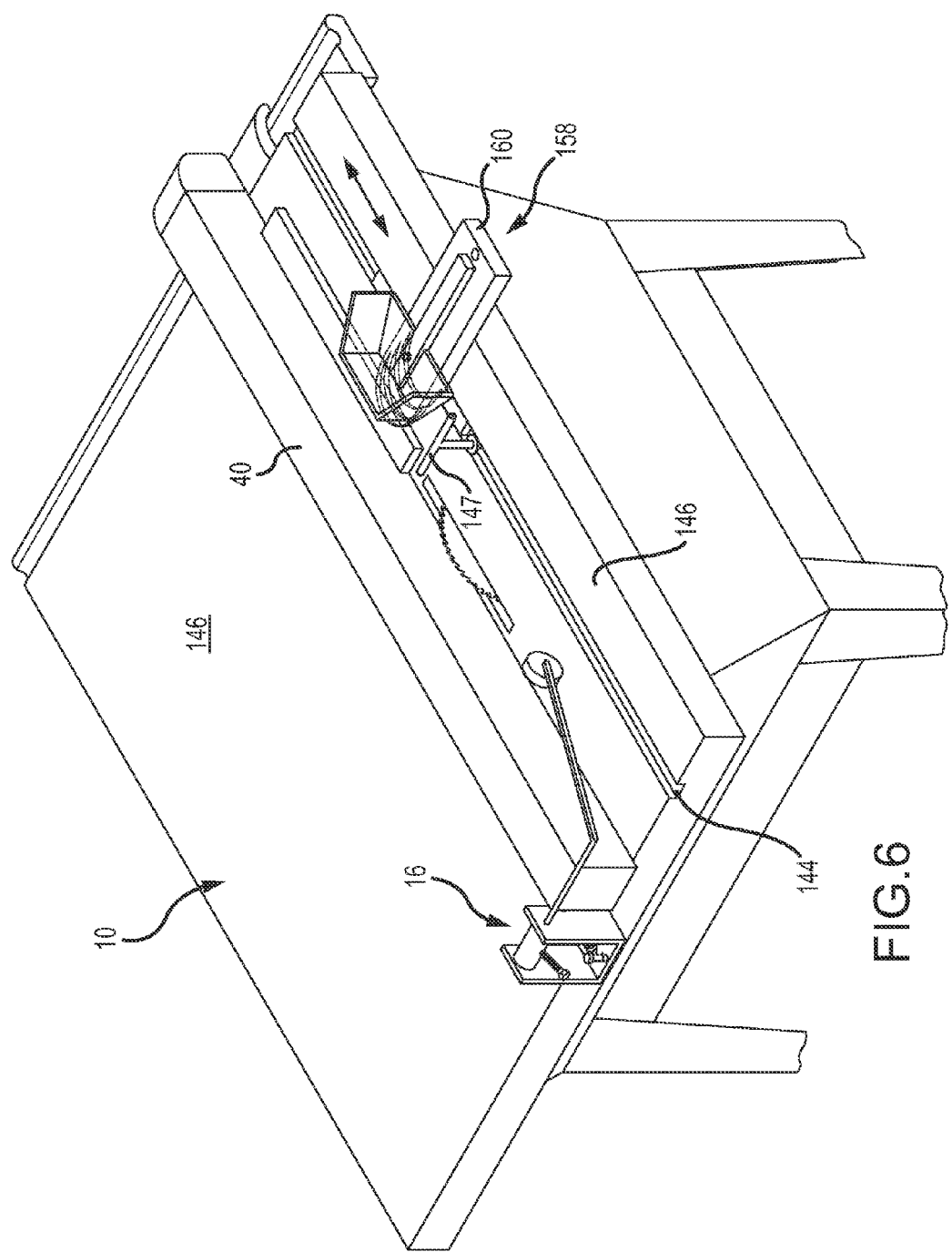

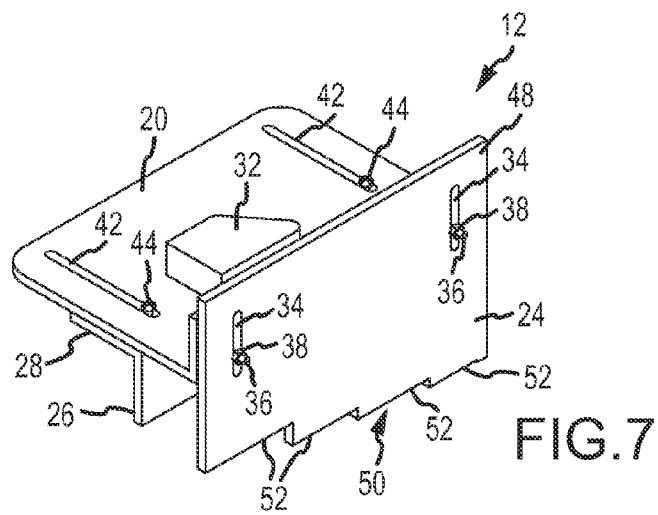
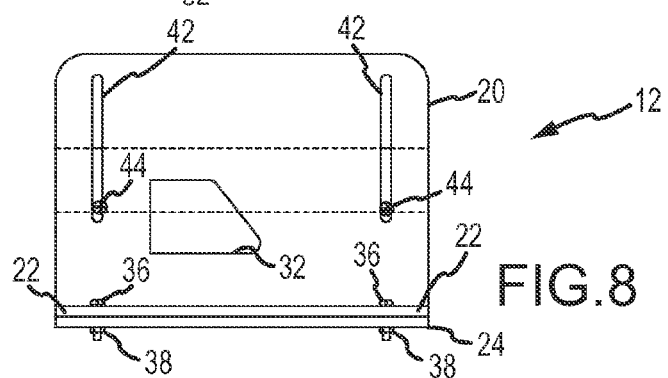
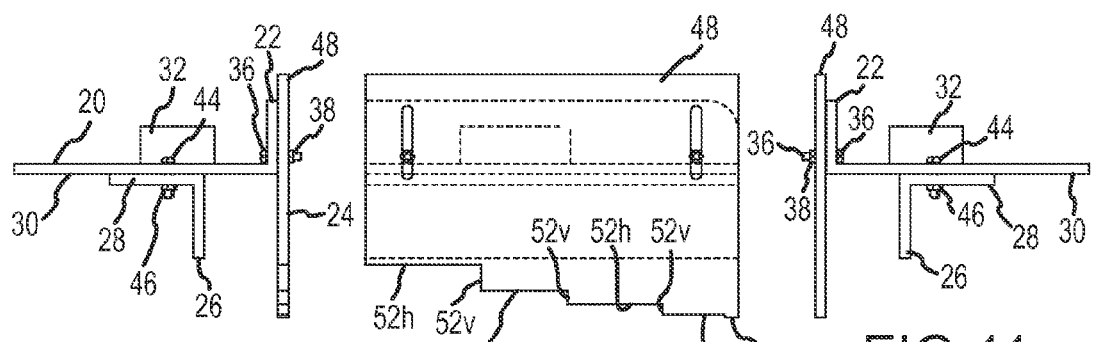

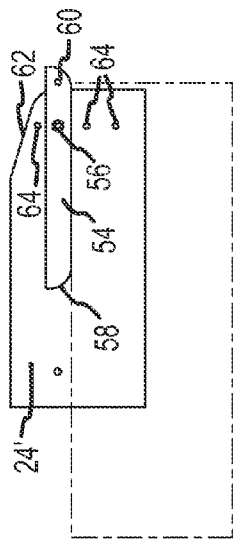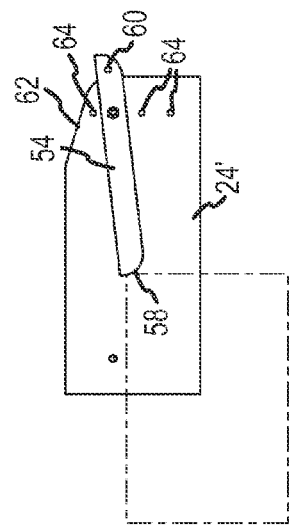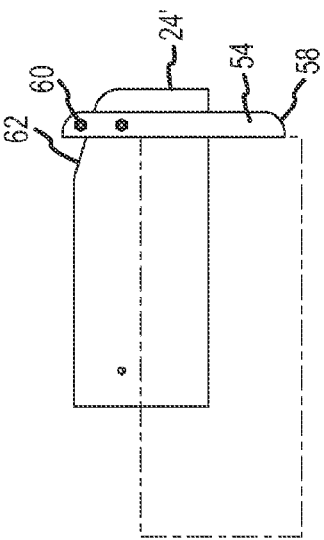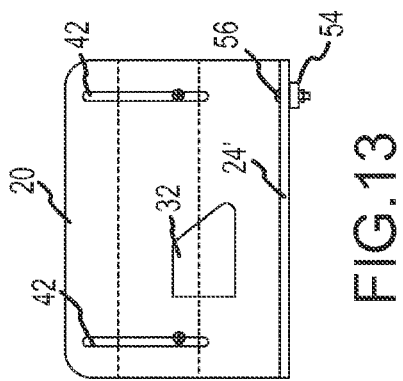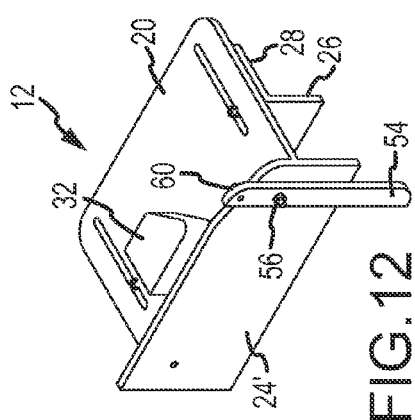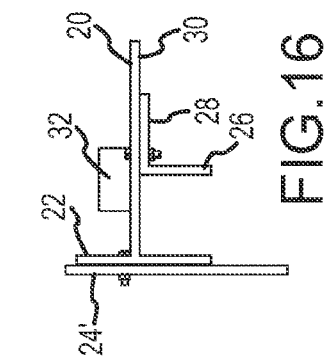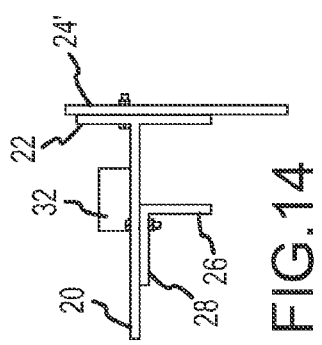

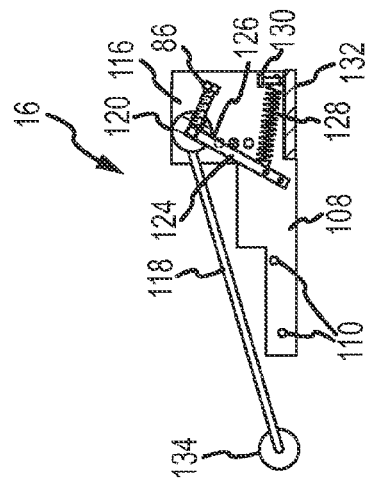
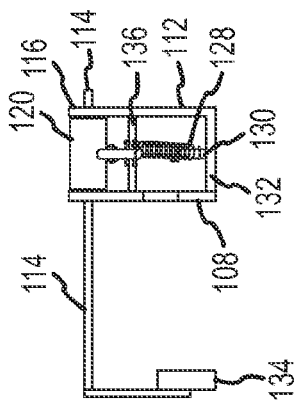
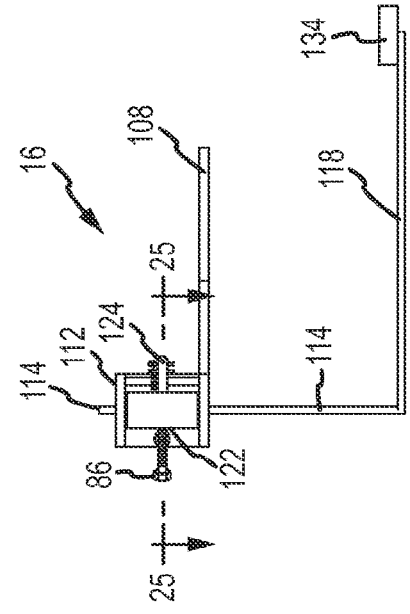
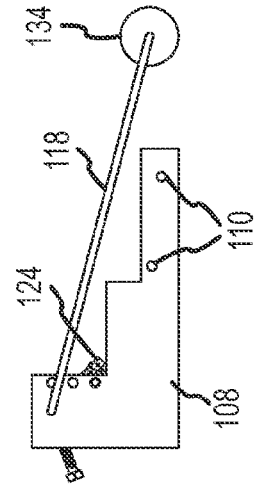
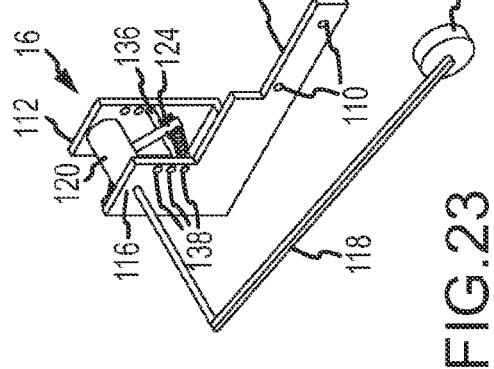
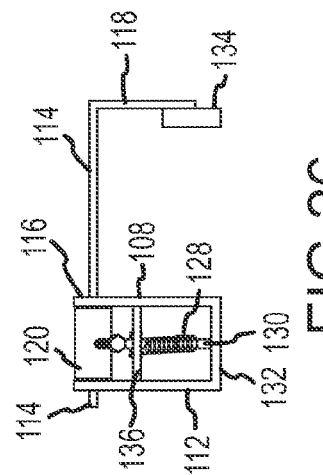

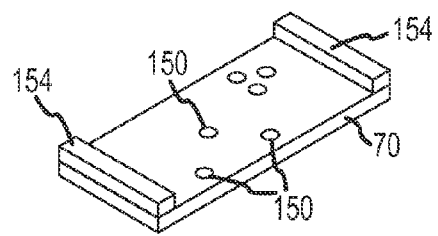
FIG.29A
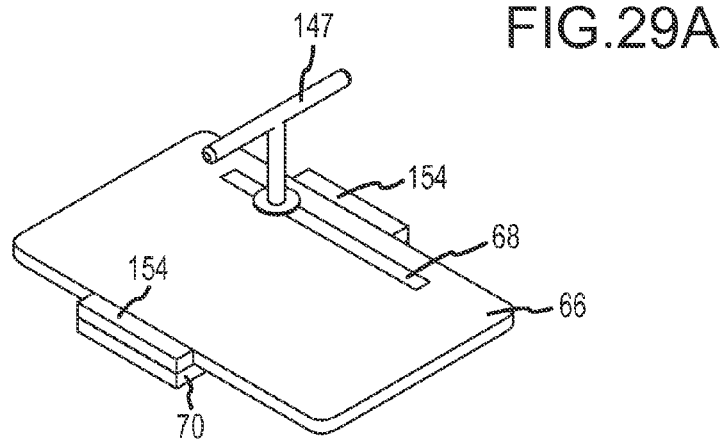
FIG.29B
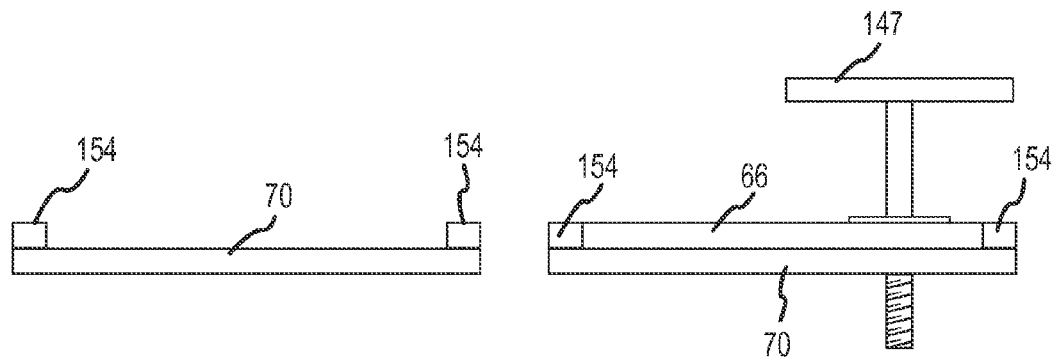
FIG.30A
FIG.30B

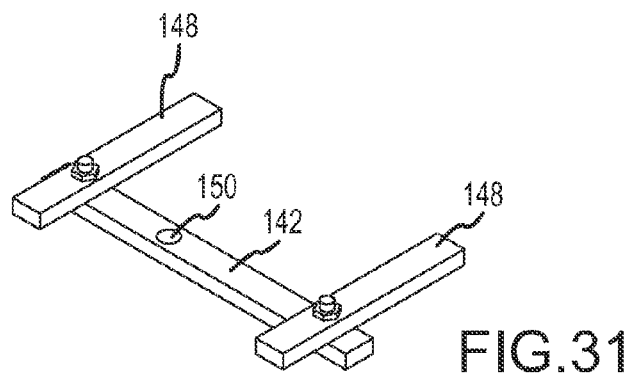
FIG.31
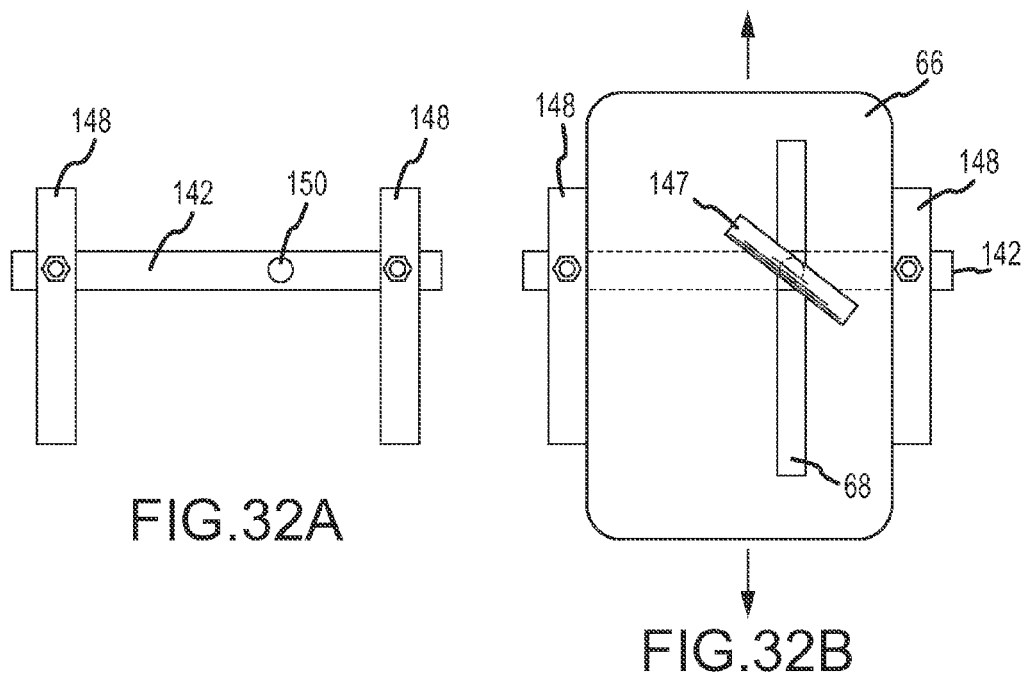
FIG.32A
FIG.32B
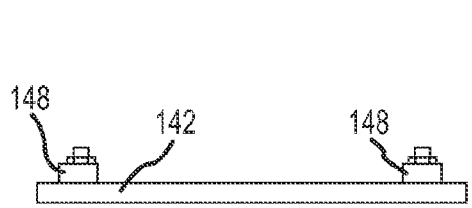
FIG.33A
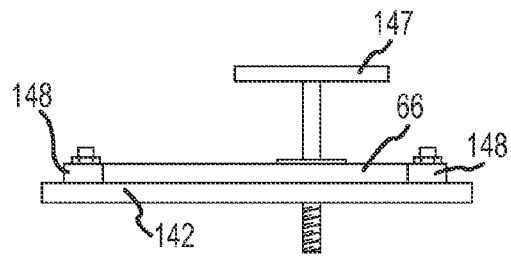
FIG.33B

SAFETY DEVICE FOR POWER CUTTING TOOLS

CROSS REFERENCE TO RELATED APPLICATIONS

The present application claims the benefit of U.S. Provisional Application Ser. No. 61/721,390 filed Nov. 1, 2012 entitled "Quick Release for Hold Down Device," and is a continuation-in-part of U.S. patent application Ser. No. 13/295,813 filed Nov. 14, 2011 entitled "Safety Device for Table Saw," which claims the benefit of U.S. Provisional Patent Application No. 61/413,283 filed Nov. 12, 2010 entitled "Safety Device for Table Saws," U.S. Provisional Patent Application No. 61/431,275 filed Jan. 10, 2011 entitled "Safety Device for Left-Handed Use of Table Saw," and U.S. Provisional Patent Application No. 61/533,663 filed Sep. 12, 2011 entitled "Adjustable Safety Device for Saws," the entirety of each are incorporated herein by this reference.

FIELD OF THE INVENTION

The present invention relates to a safety system for powered cutting tools, primarily table saws, router tables, miter saws and planers/jointers. The system comprises a number of component devices that, alone or in combination, provide enhanced safety and reduce or eliminate injuries to an operator of the equipment. The devices attach to a frame or table associated with the powered cutting tool and are adapted for securing work pieces during a cutting operation, protecting the operator's hands and arms and, in some instances, simultaneously improving the versatility of the cutting tool.

BACKGROUND OF THE INVENTION

Power cutting tools having a rotating blade or cutting element, such as table saws, miter saws, routers, jointers and shapers, are dangerous. Thousands of operators of these types of cutting tools are severely injured every year. According to data from the United States Consumer Products Safety Commission, roughly 31,000 people are treated in emergency rooms every year for table saw injuries. It is believed that injuries resulting from use of table or cabinet-based power cutting tools other than table saws are equally significant, statistically and in the nature of the injury to the operator, but are not well reported because fewer people own and use such equipment. The physical injury and trauma to an operator's hand and/or fingers is often significant. Injuries occur due to several factors, including lack of understanding by the operator of the equipment and/or characteristics of the wood being cut, inattentiveness, fatigue, work piece kickback and misuse of or misplaced reliance on accessory devices such as push sticks, feather boards, splitters and kerf blades.

As wood is cut, particularly with a table saw, preexisting stresses in the wood are released. The partially cut work piece may move, twist, or bend and the gap or kerf between the cut portions of the wood close together before the work piece is fully cut. With the two separate halves pressing together at the rear of the blade where the saw teeth of the blade are rising up from the table, a work piece can be thrown forwards toward the operator as a projectile. This event is termed a kickback. A second form of kickback may occur if the saw's rip fence or guide fence is misadjusted so as to be slightly closer to the rear of the blade than the front, rather than being parallel to the blade. In this case, the fence can push the wood into the saw blade, leading to a similar result. Splitters and stationary blades mounted behind a rotating saw blade are one type of tool designed to prevent or reduce kickback. However, in practice, such devices do not prevent all cases of kickback and do not address non-kickback related injuries. Moreover, they are limited to use solely with table saws and not other type of powered cutting tools.

The operator can be seriously injured by the thrown work piece. However, serious injury also results to the operator's hand and/or fingers because, prior to the kickback event, the operator is pushing the work piece toward the rotating cutting tool. With the momentum of the pushing motion directed toward the cutting tool, and with the work piece suddenly removed or its physical position unexpectedly altered, the operator's hands can be thrust into the cutting tool. Similar situations can occur when the operator is using accessory aids and when the operator is cutting small pieces of wood with his/her hands positions closely to the cutting tool.

There are different types of cuts performed by powered cutting tools. One type is ripping. A rip cut is performed on a table saw by passing the wood between the blade and a rip fence parallel to the grain of the wood. A cross-cut is the same, but is performed across the grain of the wood. Another type of cut is mitering, and is performed by a specialized miter saw where the blade may be repositioned at an angle relative to the work piece. Mitering is an angle cross-cut. Another type of cut is beveling. Most bevels are rip cuts using a rip fence as a guide with the blade or table tilted to achieve the required angle. Bevel cuts may be made on a miter saw or a table saw. Another type of cut is a dado. A dado cut is done by setting a table saw blade to a cutting depth less than the thickness of the work piece to form a u-shaped cut or groove. The dado cut does not go entirely through the work piece. Routing also involves cutting a groove in a work piece. A jointer or shaper cuts or shaves an entire surface of a work piece, such as an edge, to remove or reduce a bow or curve in the work piece. Serious injuries can occur with each of these devices. While all of these devices are different, each has a cutting zone which is the area proximate the moving blade or cutting instrument.

Attempts to develop safety devices for powered cutting tools have been made with limited success. For example, the website www.tablesawaccidents.com/new-page-3.htm shows three safety devices which have limited applicability and usefulness. The device identified as Hand Guard, is a work piece pusher for use in connection with a table saw. It provides a single notch or cut-out at its base which has an adjustable depth to accommodate work pieces of different thicknesses. However, this device is positioned between the saw blade and the guide fence when used. No protection is provided to the operator's hand and use of this device requires the operator's hand to pass by the rotating saw blade. It also limits the narrowness of a cut that can be made on a table saw due to its own width. A second similar device is also shown under the name Push Block. While it saddles and moves along a rip fence, it also provides no protection for the user's hand and only includes a single notch to accommodate a single work piece thickness. In addition, it is not adjustable to accommodate use with guide fences of different sizes and shapes. Further still, an anti-kickback roller device is shown. The device applies a downward pressure on the work piece. As illustrated, one device may be placed before the cutting blade and one positioned following the cutting blade. When deployed in this manner, the devices prevent the use of other needed safety devices, including a work piece pusher and hold down device. Indeed, the Hand Guard and Pusher Block devices depicted on the same web page could not be used with the anti-kickback devices as the forward anti-kickback device prevents the any type of pusher device from moving the work piece completely past the saw blade. It also appears that the post cut anti-kickback device requires the operator to manually lift and position the roller on the work piece, bringing the operator's hand dangerously close to the moving saw blade. Yet another safety device used with table saws is sold under the name SawStop by SawStop, LLC of Tualatin, Oreg. This device is designed to cause a table saw blade to quickly stop, with no injury to an operator's hand. However, this device costs hundreds of dollars and is not designed to be retrofit with existing table saws. Further still, all of the foregoing devices are designed and intended to be used with table saws and do not address the significant and serious injuries created with miter saws, routers, jointers and shapers.

SUMMARY OF THE INVENTION

Accordingly, a novel system, devices, and methods are disclosed herein for safely operating powered cutting tools.

In one embodiment, the present invention contemplates a selectively positionable device for securing a work piece while also positioning a user's left hand at a safe distance away from the cutting zone, namely, the area proximate the rotating blade of a table saw, and providing protection in the event the user's hand were to inadvertently move toward an active blade. The device is secured to the base, frame or table top of the table saw while also being selectively positionable relative to the cutting tool to permit necessary positioning and movement of the work piece relative to and at different orientations to the cutting blade while simultaneously holding down the work piece to reduce kickback and providing protection for the operator's left hand. In one embodiment the device comprises a base that is rotatably secured to the table top of the cutting tool. A leading or front portion of the device that engages the work piece is provided with a series of stepped surfaces or shoulders to accommodate work pieces of different thickness. The device pivots or rotates to facilitate positioning relative to the work piece regardless of the size of the work piece. Rotation of the device allows constant contact with the work piece. It holds the work piece against the rip fence and holds it down against the surface of the table saw. Complete control of the work piece is provided. A physical stop is also provided such that the device cannot move into contact with the blade of the cutting tool nor cause the work piece to be pinched against the cutting tool and create a kickback.

In another embodiment also designed for use with a table saw and intended to be used in combination with the previously described left hand device, a device is provided which is also designed to hold down the work piece at a different location and, at the same time, push the work piece past the saw blade quickly and safely. The safety device fits over or saddles the rip fence and slides forward to push the work piece through the cutting zone and past the rotating blade. In a first embodiment, the device generally comprises a left wall, a top wall and a right wall. The left wall and right wall are spaced apart slightly more than the width of a rip fence. The top wall is attached to the left and right walls and slides along the top of the rip fence. A handle is provided to be grasped by an operator. The left wall extends vertically above the top wall and handle to protect the operator's hand from the saw blade in the event of an unexpected kickback or other accident or mistake. The lower portion of the left wall is formed with a series of stepped or increasingly large cut-outs. The cut-outs are designed to accommodate work pieces of different thickness. It should be appreciated by those of skill in the art that the cut-outs may be dimensioned in any number or variety of different sizes to accommodate work pieces of different thickness. There also may be more or fewer than four cut-outs. In a further alternative embodiment, the device may also be constructed in an adjustable version that allows adjustment of the left wall relative to the top and right wall to accommodate use with work pieces of different thicknesses by altering the position of the cut outs relative to the cutting surface.

A further embodiment of the safety device described in the prior paragraph is more fully adjustable. Here, the relative position of the component pieces are adjustable to accommodate rip fences of different dimensions.

A still further embodiment right hand hold down and pusher concept described in the prior paragraphs is one that incorporates a swing arm push element and is designed for use with a router, jointer and/or shaper, instead of a table saw. Here, instead of using a left wall with a series of cutouts, a swing arm is affixed to the left wall and permits a work piece to initially pass underneath the swing arm, rotating the swing arm to a position on top of the work piece. Once the work piece passes completely underneath the swing arm, the swing arm rotates to a generally vertical position where it engages the rear or trailing edge of the work piece, allowing the operator to completely push the work piece past the cutting element in a safe manner protecting the right hand of the operator. The position of the swing arm is adjustable to accommodate work pieces of different height.

Yet another embodiment for use with table saws is, for example, in making dado cuts. The dual bearing hold down device is provided with two separate bearing elements that press the work piece in two directions to safely secure the work piece and eliminate work piece kickback. A first bearing element presses the work piece against the guide rail or rip fence, and a second bearing element presses the work piece in a perpendicular direction against the surface of the cutting table. Both bearing elements are biased against the work piece and the biasing force is adjustable. Additionally, the device itself is positionally adjustable to accommodate work pieces of different sizes. Further still, the bearing arm that positions the second bearing element may comprise different lengths to position the second bearing element at different locations relative to the cutting element, thereby facilitating a variety of different cuts and use with different blades as the situation may require.

The dual bearing hold down device may also be utilized in connection with a jointer, planer, shaper or router. In one embodiment, the dual bearing hold down device comprises a base plate that covers a substantial portion of the rotating cutting element, thereby eliminating any opportunity for the operator's hand to accidentally contact the cutting element.

A further embodiment of the present invention comprises an ant-kickback wheel. This device is contemplated primarily for use with table saws, but may also be used with other devices. In connection with table saws, the device includes a bracket or base designed to attach at or near the distal end of the guide fence with a wheel that rides on top of the work piece to provide pressure holding the work piece against the surface of the table saw and against the rip fence, greatly reducing the chance of kickback. The freely rotating wheel is adjustably positionable by a wheel bearing arm to accommodate work pieces of different thicknesses and widths and to apply adjustable pressure, as needed. The larger the diameter of the wheel, the more readily the wheel automatically engages and rides over the top of a work piece without the need for an operator to manually position the hold down wheel on the work piece, thereby eliminating the need for the operator's hand to be located near a rotating cutting instrument. The wheel bearing arm is also designed to move completely out of the way without having to dismount or disconnect the device from the equipment.

Another embodiment of the safety system comprises a device which is used with a miter saw and is designed to secure a work piece in a position to achieve an intended cut while protecting the operator's hand against injury. In one embodiment, the device is securable to the base or table of the miter saw. The device is rotatable about an axis in a plane generally parallel to the work surface or table surface of the saw. Securing means is provided to securely position the device in a desired position with respect to the saw and work piece. In a preferred embodiment, the device further comprises a planer body having an upper surface and a lower surface. The lower surface contacts the work piece and the upper surface is engaged by the user for applying downward pressure on the work piece. An upstanding safety wall is positioned on the upper surface for preventing or limiting a user's reflexive or unintentional movement of his/her left hand into the cutting area. The lower surface may also comprise a subtending guide member that provides a second surface to engage and secure a work piece. The guide member prevents a work piece from translating or sliding laterally along the work surface away from the saw blade. In some embodiments, the device may further comprise one or more alignment plates for consistently orienting the device in a desired or aligned orientation relative to a fixed component of the saw, such as the guide fence or guide rail. In addition, in some embodiments, at least a portion of the lower surface of the securing member comprises friction or gripping means to enhance holding the work piece and prevent movement of a work piece relative to the device and the saw blade. Friction means include, but is not limited to, sandpaper, protrusions extending from the lower surface, knurled surfaces, adhesives, magnets, and various similar objects for gripping or engaging the work piece as will be recognized by one of ordinary skill in the art. The securing device is also provided with a positioning arm that extends away from the planer body in a direction generally away from the saw blade. A longitudinal slot is formed in the positioning arm and engages a threaded post secured to the base or frame of the saw, allowing the device to pivot about the post and be repositioned laterally along the work surface to accommodate work pieces of different shapes and sizes. Cylindrical spacers may be positioned on the threaded post, under the positioning arm to elevate the securing member relative to the work surface of the saw to accommodate work pieces of different thicknesses.

In addition, the miter saw hold down device enhances the ability to cut a work piece, including relatively small work pieces. Difficult and dangerous cuts not previously contemplated with a miter saw may be made easily and safely.

In alternative embodiments, each of the foregoing described components may be provided with visual or tactile safety indicia to indicate to a user that appendages, such as the user's hand and fingers, should not extend past a predetermined point or be positioned in a location other than as indicated. Indicia for use in the present invention include, but are not limited to, protrusions, indentations, markings, grooves, stepped features, text, symbols and similar features, as well as various combinations thereof.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 6 is a perspective view of a further alternative embodiment of an exemplary safety system of the present invention.

FIG. 7 is a perspective view of one embodiment of a right hand push device, primarily intended for use with a table saw.

FIG. 8 is a top plan view of the embodiment of FIG. 7.

FIG. 9 is a left side plan view of the embodiment of FIG. 8.

FIG. 10 is a front plan view of the embodiment of FIG. 8.

FIG. 11 is a right plan view of the embodiment of FIG. 8.

FIG. 12 is a perspective view of an embodiment of a swing arm push device of the present invention, primarily intended for use with a jointer, router and/or shaper.

FIG. 13 is a top plan view of the embodiment of FIG. 12.

FIG. 14 is a left plan view of the embodiment of FIG. 13.

FIG. 15A is a front plan view of the embodiment of FIG. 12, further showing a work piece in phantom with a push bar in a horizontal position resting on top of the work piece.

FIG. 15B is a front plan view of the embodiment of FIG. 12, further showing the swing arm disengaging the trailing edge of a work piece (shown in phantom) as the work piece moves to the left.

FIG. 15C is a front plan view of the embodiment of FIG. 12, further showing the swing arm horizontally aligned with the trailing edge of the work piece (shown in phantom) to enable pushing of the work piece through a cutting zone.

FIG. 16 is a right plan view of the embodiment of FIG. 13.

FIG. 23 is a perspective view of one embodiment of an anti-kickback device of the present invention.

FIG. 24 is a top plan view of the embodiment of FIG. 23.

FIG. 25 is a cross-sectional view taken along line 25-25 of FIG. 24.

FIG. 26 is a left plan view of the embodiment of FIG. 24.

FIG. 27 is a front plan view of the embodiment of FIG. 24.

FIG. 28 is a right plan view of the embodiment of FIG. 24.

FIG. 29A is a perspective view of one embodiment of a mounting plate of the present invention.

FIG. 29B is a perspective view of the embodiment of FIG. 29A, further showing one embodiment of a base plate of a dual bearing hold down device secured thereto by a lock down bolt.

FIG. 30A is a front plan view of the embodiment of FIG. 29A.

FIG. 30B is a front plan view of the embodiment of FIG. 29B.

FIG. 31 is a perspective view of an alternative embodiment of a mounting plate of the present invention.

FIG. 32A is a top plan view of the embodiment of FIG. 31.

FIG. 32B is a top plan view of the guide plate of FIG. 32A, further showing one embodiment of a base plate of a dual bearing hold down device secured thereto by a lock down bolt.

FIG. 33A is a front plan view of the embodiment of FIG. 32A.

FIG. 33B is a front plan view of the embodiment of FIG. 32B.

While the following disclosure describes the invention in connection with those embodiments presented, one should understand that the invention is not strictly limited to these embodiments. Furthermore, one should understand that the drawings are not necessarily to scale, and that in certain instances, the disclosure may not include details which are not necessary for an understanding of the present invention, such as conventional details of fabrication and assembly.

DETAILED DESCRIPTION

Figure 1A:
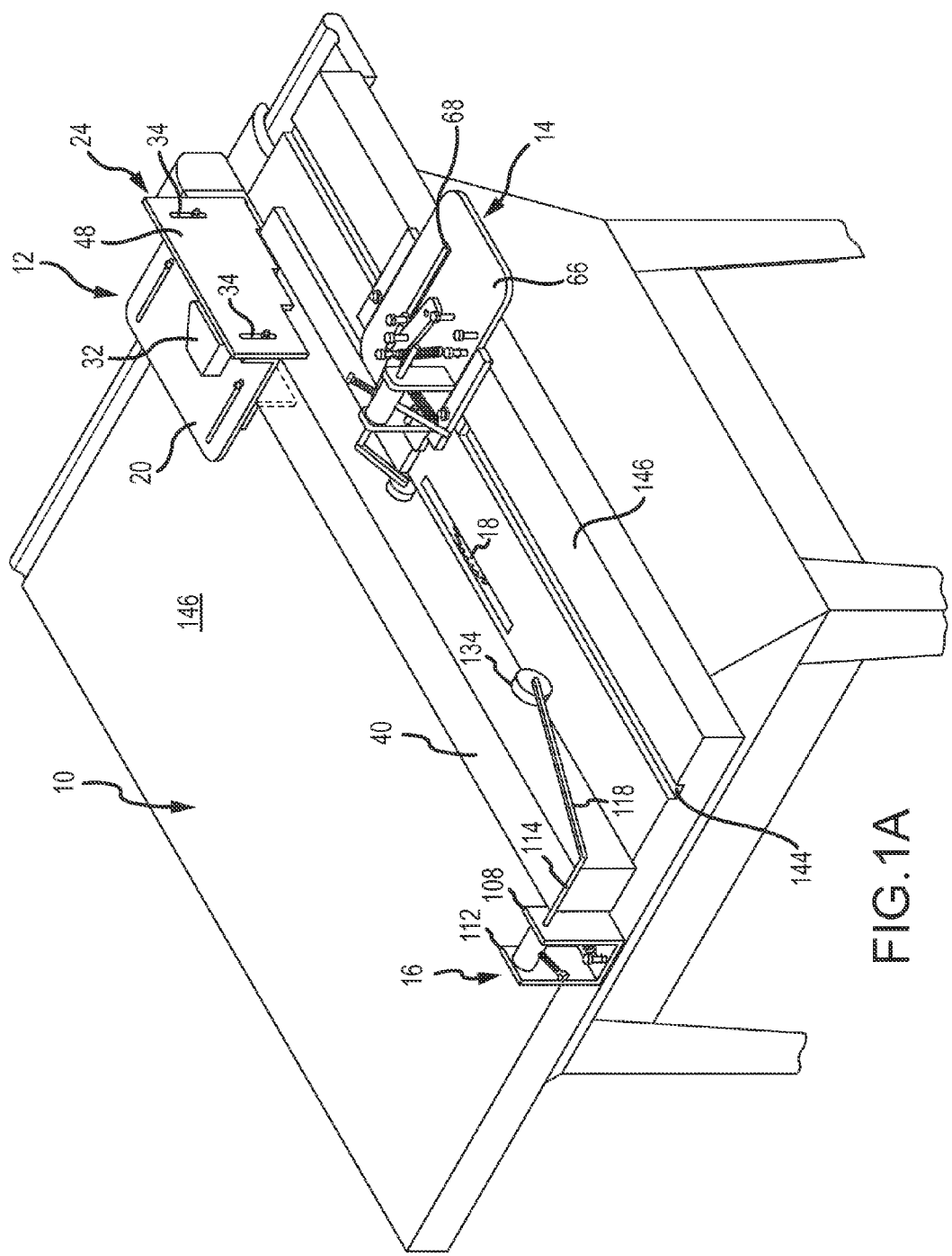
FIG. 1A is a perspective view of a table saw with exemplary embodiments of component pieces of the safety system of the present invention. A work piece is shown in a pre-cut position.
Figure 1B:
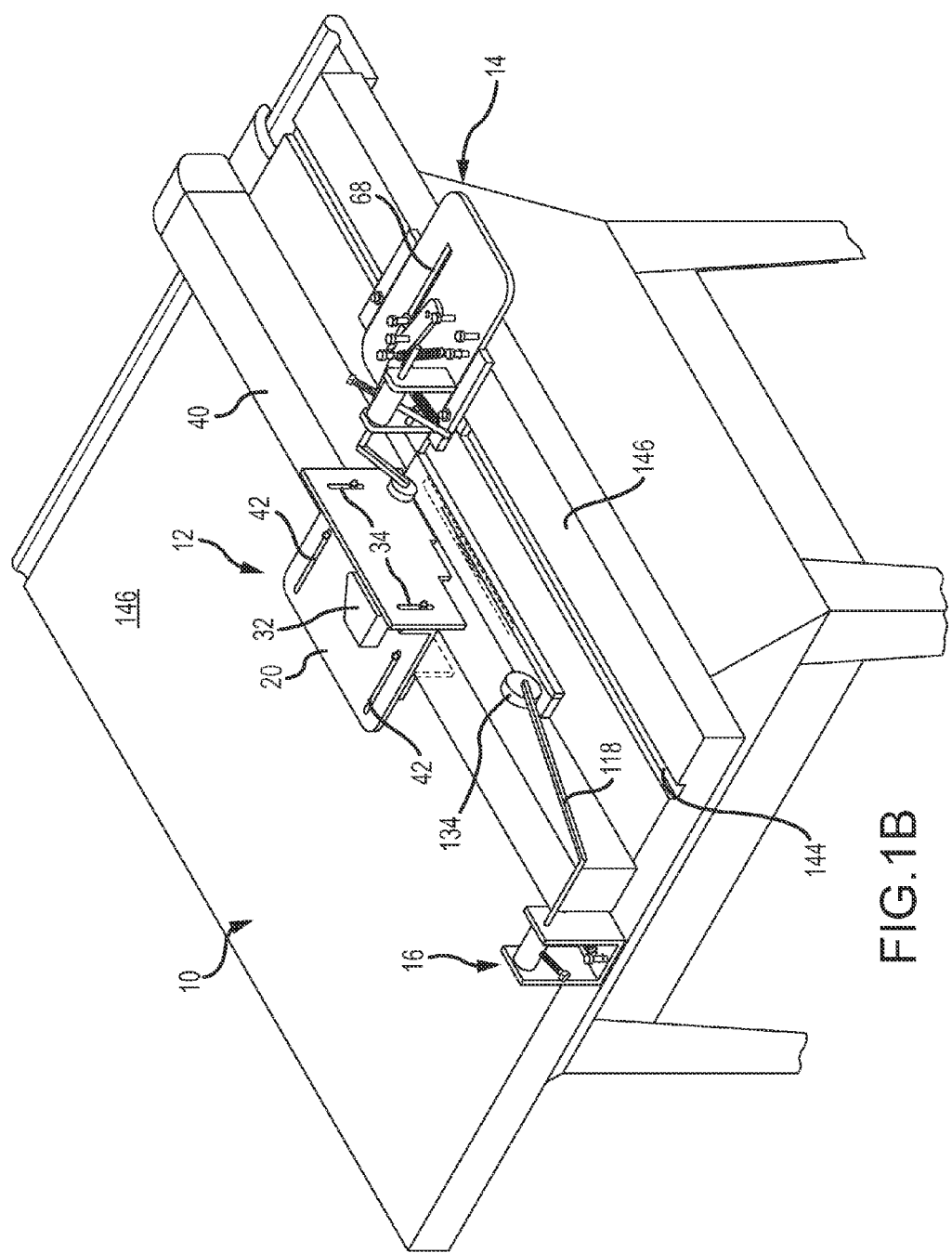
FIG. 1B is a perspective view of the exemplary embodiment shown in FIG. 1A, further showing a work piece during cutting.
Figure 1C:
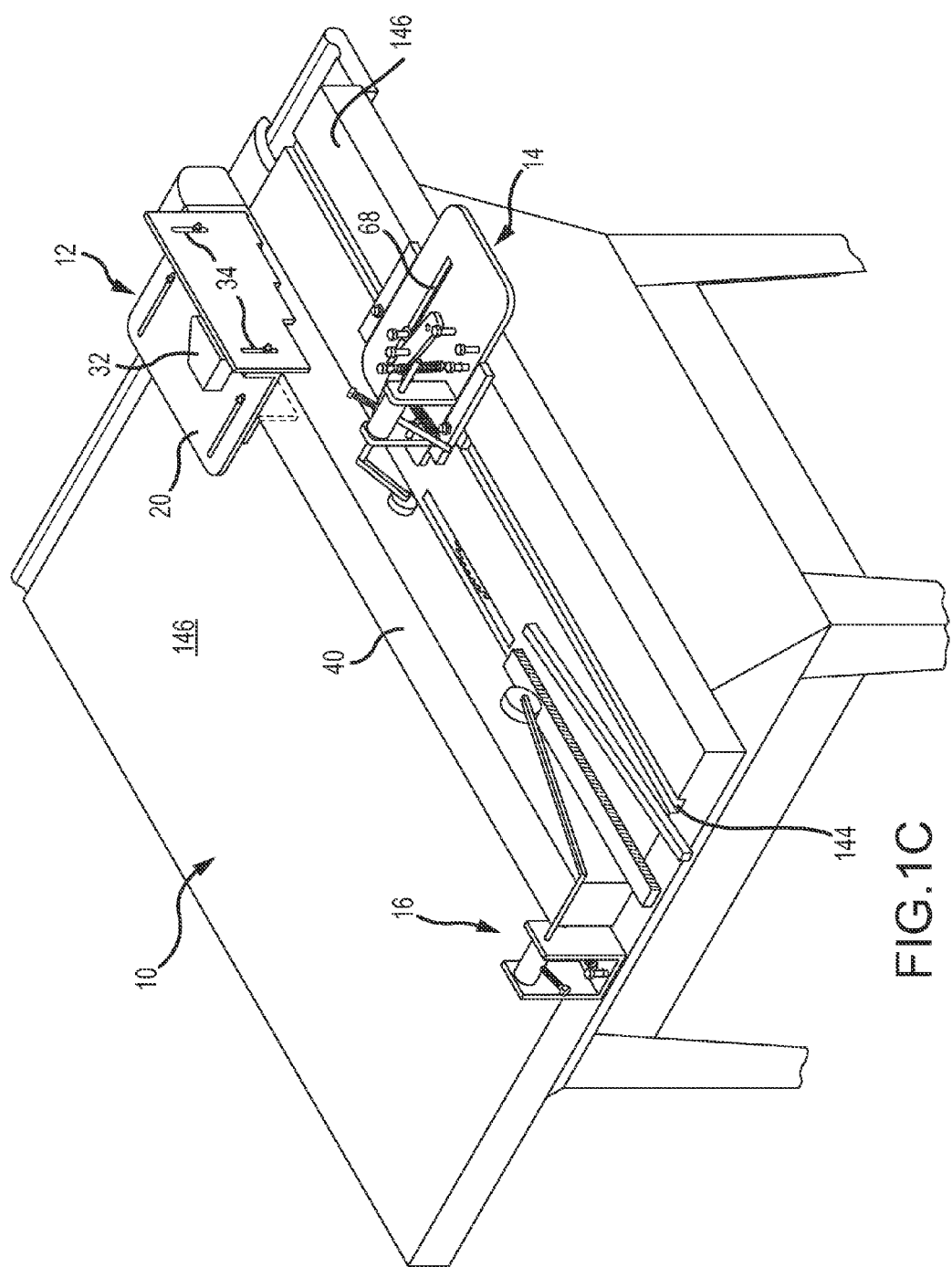
FIG. 1C is a perspective view of the exemplary embodiment shown in FIG. 1A, further showing the work piece following cutting.

Embodiments of the safety system disclosed herein include multiple separate safety devices or components that can be used individually or in combination to enhance the safety of and reduce injuries to an operator of powered cutting tools. FIGS. 1A through 1C depict a table saw 10 with exemplary embodiments of three component devices of the overall system of the present invention. These component pieces are a right hand push device 12, a dual bearing hold down device 14, and an anti-kickback device 16. However, while the dual bearing hold down device 14 is typically positioned in front of the cutting blade 18 and the anti-kickback device 16 is typically positioned following the cutting blade 18, they are not restricted to those physical locations and may be positioned adjacent or in close proximity to the cutting blade, on opposite sides of the cutting blade or at other locations selected by those of skill in the art for purposes of enhancing safety and/or facilitating use of the devices. Accordingly, the names of these components should not be viewed as limitations on the functionality of these component pieces, but are simply labels for purposes of distinguishing one component piece from the other. The right hand push device 12 is shown in greater detail in FIGS. 7-11. The dual bearing hold down device 14 is shown in greater detail in FIGS. 17-22B. The anti-kickback device 16 is shown in greater detail in FIGS. 25-28.

One embodiment of a right hand push device 12 will now be described in greater detail. Referring to FIGS. 7-11, the right hand push device 12 is a component piece designed to protect the right hand of an operator of a table saw, planer/jointer, router or other cutting equipment. FIGS. 7-11 illustrate use with a table saw 10. The right hand push device 12 comprises a horizontal plate 20 with an upstanding wall portion 22 that abuts a vertically adjustable safety wall 24. It further comprises a horizontally adjustable guide wall 26 with a horizontal portion 28 that abuts the lower surface 30 of the horizontal plate 20, and a handle 32. Vertical slots 34 are formed in the vertically adjustable safety wall 24 to receive threaded bolts 36 that extend from and are affixed to the vertically upstanding wall portion 22 of the horizontal plate 20. Nuts 38 or other securing members are affixed to the exposed end of the bolts 36 to secure the vertical adjustable safety wall 24 in a fixed position relative to the vertically upstanding wall portion 22 of the horizontal plate 20.

It should be appreciated that other ways of adjustably securing the safety wall to the horizontal plate will occur to those of skill in the art upon reading this disclosure and such methods are deemed to be within the scope of the present invention.

As is illustrated, the right hand push device 12 straddles the guide or rip fence 40 of the table saw 10 or any other cutting equipment. The straddled fit provides balance to the right hand push device. Preferably, the handle 32 is positioned on the horizontal plate 20 to be directly on top of the rip fence 40. This allows a wide variety of pressure to be applied by the operator without dislodging the right hand guide 12 from the rip fence. Slots 42 also are formed in the horizontal plate 20 to allow adjustable positioning of the guide wall 26 relative to the safety wall 24 to accommodate rip fences of different widths. Threaded bolts 44 or other securement means known to those of skill in the art extend from the horizontal portion 28 of the guide wall 26 through the slots 42 formed in the horizontal plate 20. Nuts 46 are tightened to secure the position of the guide wall 26 relative to the safety wall 24. As can be seen in FIGS. 1A and 1B, by the operator placing his or her right hand on the handle 32 and advancing the right hand push device 12 along the rip fence 40 through the cutting zone of the table saw 10, the operator's right hand is located away from the cutting zone and, should the work piece kick or jump, the upper portion 48 of the safety wall 24 blocks the operator's hand from accidentally contacting the cutting blade 18. When not in use, the right hand push device 12 may mount on a post extending from the rip fence 40.

In addition, the lower edge 50 of the safety wall 24 comprises a series of stepped cut outs 52 designed to accommodate work pieces of different thickness. Each cut out comprises a horizontal surface 52h and a vertical surface 52v. Depending upon the thickness of a work piece being cut, the appropriate cut out 52 is positioned such that the horizontal surface 52h rests on the top surface of the work piece to prevent vertical movement of the work piece during the cutting operation and the vertical surface 52v engages the trailing edge of the work piece to allow the operator to advance the work piece through the cutting zone by advancing the right hand push device 12 along the guide rail or rip fence 40 using the handle 32. It is preferred that the horizontal surfaces 52h have sufficient length to keep the work piece pushed down against the surface of the table throughout the entire cut.

In a preferred embodiment, the safety wall 24 has a width of no more than approximately 0.25-0.0375 inches to permit thin cuts while still fitting between the blade and rip fence. Making the device of aluminum, or other lightweight yet strong metal, allows the right hand push device to have a relatively thin width.

Figure 2:
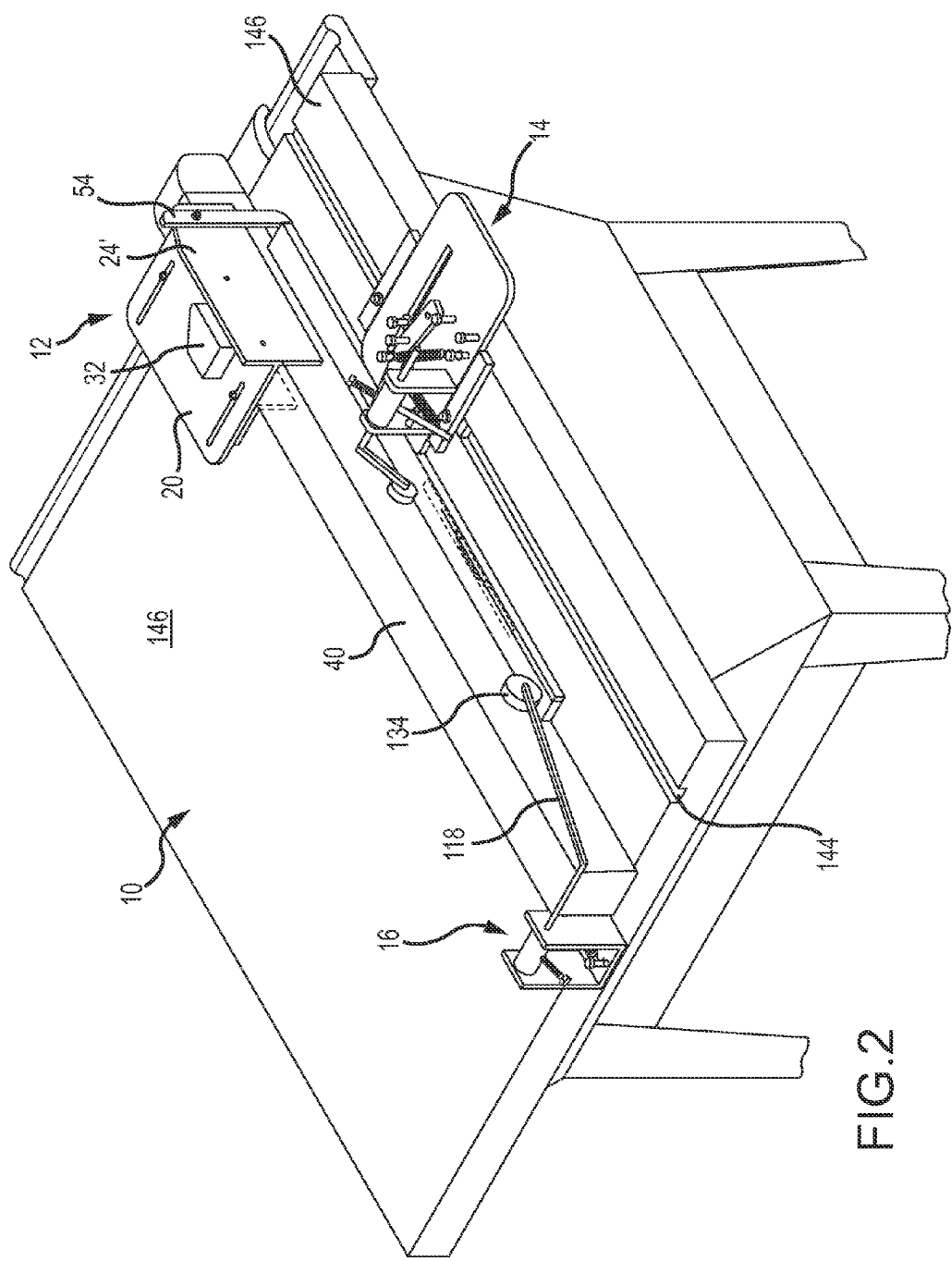
FIG. 2 is a perspective view of an alternative embodiment of an exemplary safety system of the present invention.

An alternative embodiment of the right hand push device 12 is shown in FIGS. 12-15C. In this embodiment, the horizontal plate 20 and the horizontally adjustable guide wall 26 are identical to that of the prior embodiment. However, the vertically adjustable safety wall 24 is replaced with a safety wall 24' that is fixed in position relative to the horizontal plate 20. Instead of a series of stepped cut outs, this embodiment includes a rotatable swing arm pusher 54 that is secured to the safety wall 24' at a pivot point 56. As shown in the sequence of FIGS. 15A-15C, the swing arm pusher 54 is designed to rotate 90 degrees from a horizontal position, where it rests upon the top surface of a work piece, through a vertical position shown in FIG. 15C, where it engages the trailing edge of a work piece. The bottom surface 58 of the swing arm pusher is rounded such that as the trailing edge of the work piece passes the bottom surface of the swing arm pusher 54, the swing arm pusher rotates to the position shown in FIG. 15C. Further advancement of the work piece through the cutting zone is accomplished by the operator advancing the work piece using the right hand push device 12. A stop pin 60 is positioned at the top of the swing arm pusher 54 to engage the top surface 62 of the safety wall 24' and prevent the swing arm pusher 54 from rotating past the vertical position shown in FIG. 15C. To accommodate work pieces of different thicknesses, the safety wall 24' may include a plurality of apertures 64 generally vertically aligned to adjust the vertical position of the swing arm pusher 54 by relocating the pivot point to a different aperture. FIG. 2 illustrates a table saw 10 with this embodiment of the right hand push device 12 positioned on the rip fence 40. The upper portion 48 of the safety wall 24' protects the operator's hand during cutting.

One embodiment of the dual bearing hold down device 14 is shown in FIGS. 17-21. As shown, the dual bearing hold down device 14 comprises a base plate 66, including a slot 68 for adjusting its position relative to a mounting plate 70 secured to the cutting equipment. (See, FIGS. 29A-33B.) A pair of upstanding posts 72A, 72B are positioned to one side of the base plate 66. A rotatable shaft 74 extends through the outer post 72A and inner post 72B. A bearing arm 76 is affixed to extends perpendicularly from one end of the shaft 74. A guide roller or vertical bearing 78 is positioned at the distal end of the bearing arm 76. A collar or sleeve 80 is positioned around the portion of the shaft 74 between the outer post 72A and outer post 72B. A pair of bores 82, 84 are formed in the collar 80. The first bore 82 receives a lock bolt 86 to lock the position of the collar 80 relative to the shaft 74. The second bore 84 receives a limit/tension arm 88. One end of a tension spring 90 is affixed to the distal end of the limit/tension arm 88 and the opposite end of the spring 90 is attached to a post 92 or other upstanding member affixed to the base plate 66. The tension spring 90 rotates the collar 90 and shaft 74 as one piece, provided the lock bolt 86 engages both pieces. A limit/tension arm stop 94 extends from one of the posts 72 to restrict or limit rotation of the collar 90 and shaft 74.

Figure 21:
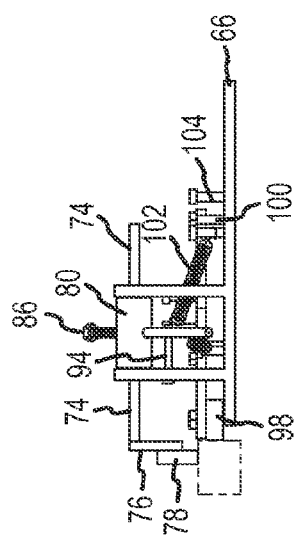
FIG. 21 is a right plan view of the embodiment of FIG. 18, further showing a work piece in phantom.
Figure 20:
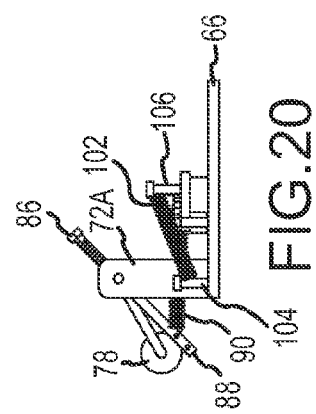
FIG. 20 is a front plan view of the embodiment of FIG. 18.
Figure 19:
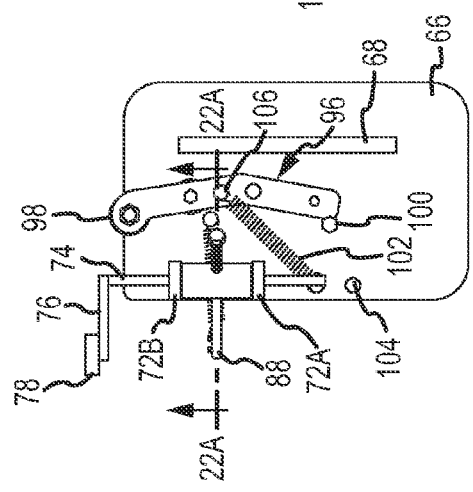
FIG. 19 is a left plan view of the embodiment of FIG. 17, further showing a work piece in phantom.

The dual bearing hold down device 14 further comprises a pivot arm 96 which pivots about a pivot point affixed to the base plate 66. One end of the pivot arm 96 includes a horizontal hold down roller or horizontal bearing 98 that abuts a side surface of a work piece and holds the work piece against a guide rail 40. A stop 100 is affixed to and extends upwardly from the base plate 66 to restrict rotational movement of the pivot arm 96. A second tension spring 102 extends between a post 104 secured to the base plate 66 and a post 106 secured to the pivot arm 96. The two tension springs force the hold down rollers to engage and apply pressure against surfaces of the work piece to hold the work piece during cutting. Additional posts 104, 106 on the base plate 66 and on the pivot arm 96 are provided to allow repositioning of the spring 102 to adjust the tension applied to the pivot arm 96 and shaft 74. FIGS. 19 and 21 illustrate engagement of a work piece or work piece by the vertical hold down bearing 78 and horizontal hold down bearing 98. One of skill in the art will appreciate that the posts 104 and 106 may be located at other positions to accomplish the same results, and will also appreciate that other known tensioning mechanisms may be substituted for the springs 90 and 102.

Figure 22B:
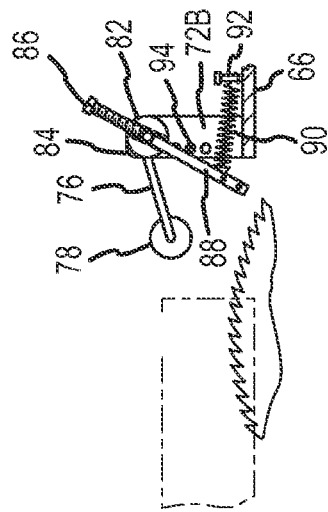
FIG. 22B is a cross-sectional view taken along line 22A-22A of FIG. 18, further showing the position of one embodiment of a vertical hold down roller following disengagement of a work piece being cut.
Figure 22A:
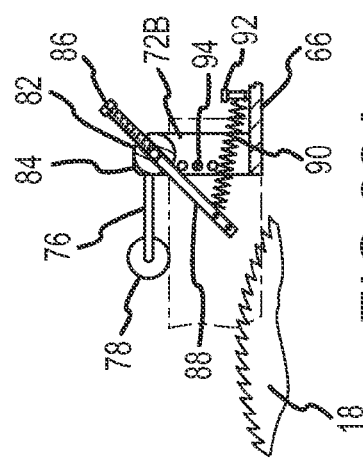
FIG. 22A is a cross-sectional view taken along line 22A-22A of FIG. 18 and further showing one embodiment of a vertical hold down roller positioned on the top surface of a work piece being cut.
Figure 34:
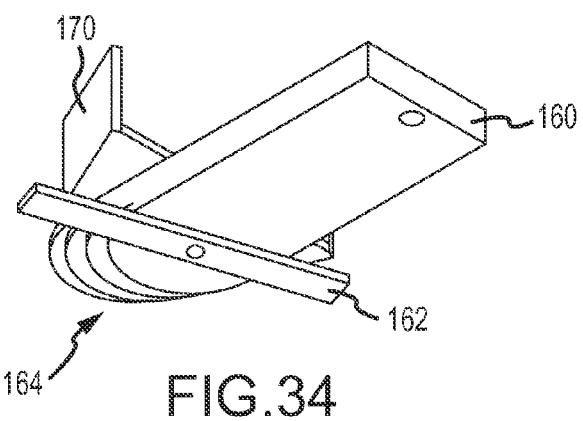
FIG. 34 is a perspective view of one embodiment of a left hand hold down device of the present invention.
Figure 35:
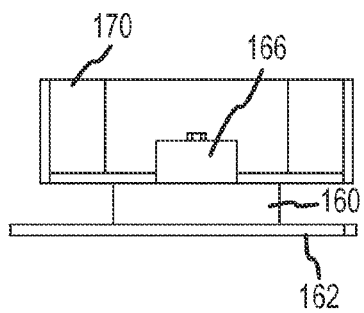
FIG. 35 is a rear plan view of the embodiment of FIG. 34.
Figure 36:
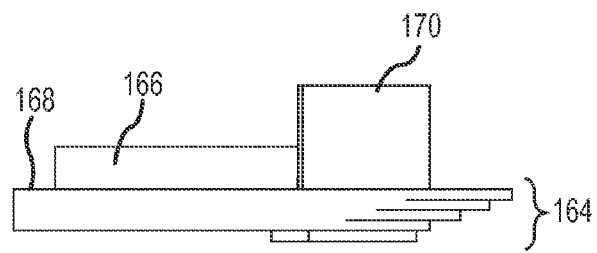
FIG. 36 is a side plan view of the embodiment of FIG. 34.

The function of the limit/tension arm stop 92 and the pivot arm stop 100 is to prevent the vertical hold down bearing 78 and/or horizontal hold down bearing 98 from contacting the blade or cutting tool, once the desired cut is completed. A principle is illustrated in FIG. 22A in association with making a dado cut. As shown, the vertical hold down bearing 78 engages the top of a work piece as the work piece is being cut by a saw blade. For a dado cut, the bearing 78 may sit directly above the blade 18. The limit/tension arm 76 is being pulled counterclockwise by the spring 90 to apply downward force on the upper surface of the work piece by the vertical hold down bearing 78. This prevents the work piece from kicking or jumping. As shown in FIG. 22B, when the tail end of the work piece moves past the vertical hold down bearing 78, the force applied by the tension spring 90 acts to move the limit/tension arm 76, collar, shaft and vertical hold down arm counterclockwise towards the cutting blade. However, the limit/tension arm stop 94 limits the rotation of this assembly and prevents the vertical hold down bearing 78 from coming in contact with the blade 18. The limit stop 94 may be adjusted either by repositioning it in different apertures formed in the inner post 72B or alternatively, by adjusting the position of the collar 80 relative to the shaft 74 using the lock bolt. Alternatively, the dual bearing hold down device 14 may be positioned such that the vertical bearing 78 is not positioned over the blade or, a shaft 74 with a longer length bearing arm 76 may be substituted. A longer bearing arm 76 will position the bearing roller away from the saw blade.

Figure 18A:
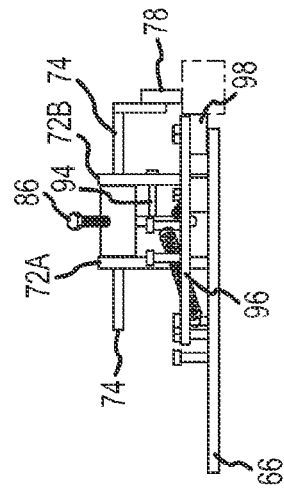
FIG. 18A is a top plan view of an alternative embodiment of the embodiment of FIG. 18
Figure 18:
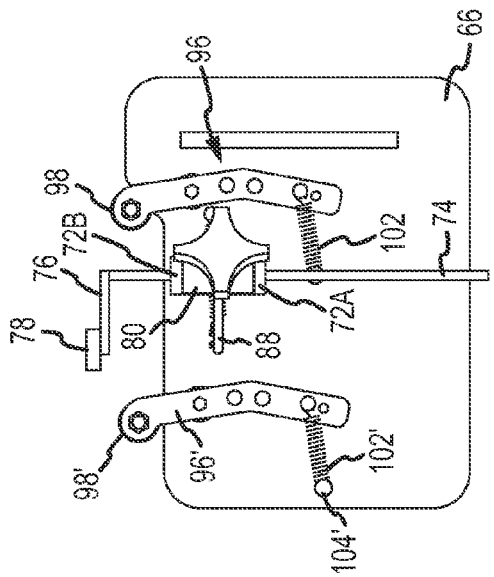
FIG. 18 is a top plan view of the embodiment of FIG. 17.
Figure 17:
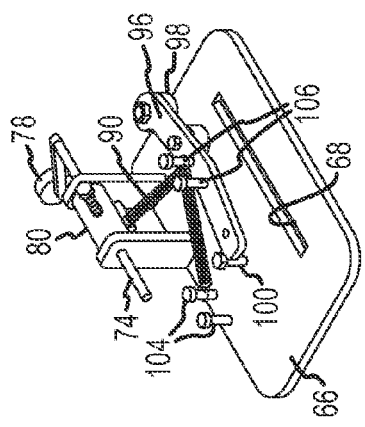
FIG. 17 is a perspective view of one embodiment of a dual bearing hold down device according to the present invention.

A triple bearing hold down device is shown in FIG. 18A. It is nearing identical to the dual bearing hold down device shown in FIGS. 17-21, except that a second horizontal pivot arm 96' is affixed to the base plate 66. A horizontal hold down bearing 98' is affixed to the distal end of the second horizontal pivot arm 96' to engage a work piece in the same manner as the first horizontal pivot arm 96. An adjustable spring 102' interconnected between post 104' and the second horizontal arm 96' applies a biasing force to the second horizontal arm 96'. However, it is intended that the cutting instrument be positioned between the two horizontal hold down bearings 98 and 98'. In this way, the work piece is pushed against a rip fence or guide before and following the cutting of the work piece providing enhanced stability of the work piece and improved operator safety. The triple bearing hold down device is preferably suited for use with a router, jointer or table saw used for dado cuts. Also, the shaft 74 is elongated in length compared to that shown in FIG. 18 to allow the vertical bearing 78 to be moved away from the base plate 66 to accommodate wider work pieces.

Figure 3:
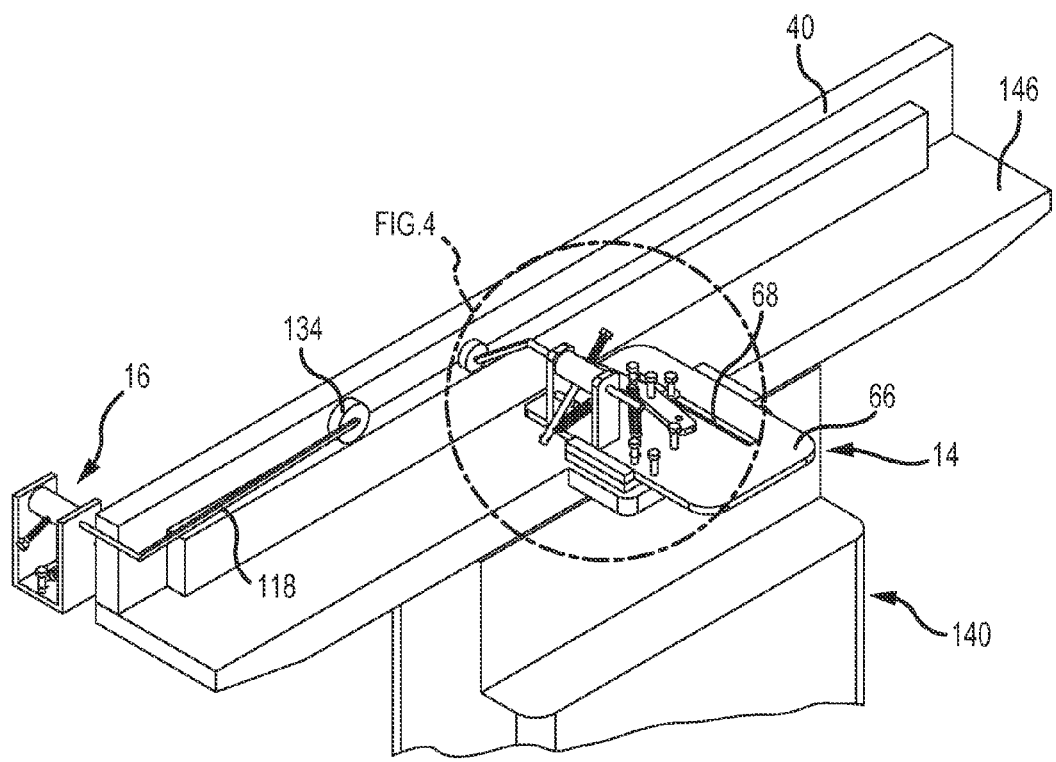
FIG. 3 is a perspective view of a jointer with the exemplary embodiments of components pieces of the safety system of the present invention.
Figure 4:
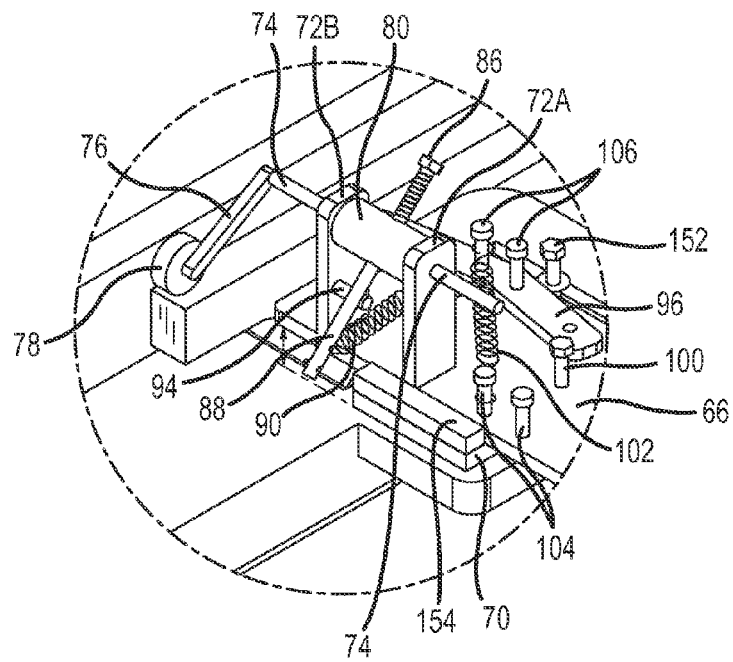
FIG. 4 is an exploded view of an exemplary embodiment of a dual bearing hold down device shown in FIG. 3.

One embodiment of an anti-kickback device 16 is shown in FIGS. 23-28. It operates in a similar fashion to the dual bearing hold down device 14. As shown in FIGS. 1A-1C and 2, the anti-kickback device 16 is secured to or near the distal end of the rip fence or guide rail 40 of a table saw 10, planer (FIG. 3) or similar cutting tool. The anti-kickback device 16 comprises an inner post 108 with apertures 110 to allow the inner post 108 to be secured to the rip fence 40 using sheet metal screws or similar attachment members. An outer post 112 is disposed at a position spaced from and parallel to the inner post 108. A shaft 114 extends through apertures 116 in both the inner and outer post 108, 112. An arm 118 extends perpendicularly from one end of the shaft 114 and a vertical hold down roller 134 is positioned at the opposite end of the arm 118. A collar 120 surrounds that portion of the shaft that is positioned between the two posts 108, 112. The collar 120 includes a first aperture 122 to receive a lock bolt 86 which affixes the position of the collar 120 relative to the shaft 114. A limit/tension arm 124 extends from a second aperture 126 in the collar. The distal end of the limit/tension arm 124 is secured to one end of a tension spring 128. The opposite end of the tension spring 128 is secured to a post 130 affixed to the base plate 132 of the jig as shown in FIG. 25. The position of the hold down roller 134 can be adjusted to correspond to the thickness of a work piece by adjusting the relative position of the collar 120 and shaft 114. The outer post 112 further includes a limit/tension arm stop 136 to limit rotation of the shaft 114, arm 124 and vertical hold down roller 134 to avoid contact between the roller 134 and the cutting blade 18 of the equipment. Potential contact between the vertical hold down roller 134 and the cutting blade 18 can also be avoided by repositioning the limit stop 136 into one of a plurality of other apertures 138 in the post 112 or by positioning the anti-kickback device 16 at a position laterally offset from the cutting blade as shown in FIGS. 1A-2 in connection with a table saw 10, and as shown in FIG. 3 in connection with a planer 140.

As shown in FIG. 1A, as a piece of wood or work piece is initially positioned for advancement through the cutting zone of a table saw, the vertical hold down bearing or roller 78, 134 of both the dual bearing hold down device 14 and anti-kickback device 16, respectively, may not be in contact with the work piece. As the work piece is advanced, it will initially cause the vertical bearing 78 of the dual bearing hold down device 14 to rotate to a position on top of the work piece to hold the work piece down vertically as it advances through the cutting zone. Repositioning of the vertical bearing 78 to a position on top of the work piece applies the tension of the tension spring 90 to the work piece to assist in the vertical bearing 78 applying necessary pressure to the top surface of the work piece during the cutting operation. Simultaneously, the horizontal bearing 98 applies inward pressure against the side of the work piece to secure the work piece against the side wall of the rip fence 40. As the work piece further advances through the cutting zone, as shown in FIG. 1B, the leading edge of the work piece passes underneath the vertical hold down roller 134 of the anti-kickback device 16 such that the work piece is now secured on both sides of the cutting zone. Movement of the vertical hold down roller 134 to a position on top of the work piece applies the tension in the tension spring 128 to the work piece to cause the vertical hold down roller 134 to apply a necessary force to the work piece to prevent undesired kicking and jumping during the cutting operation. Regardless of the thickness of the work piece, the pressure applied by the tension springs 78 and 134 remains constant. As shown in FIG. 1C, following complete cut of the work piece, the vertical hold down roller 134 of the anti-kickback device 16 still secures the work piece, prevents kickback and prevents the work piece from falling to the floor and being damaged. The larger the diameter of the roller 134, the more likely it is that the roller 134 will automatically reposition itself to the top of the work piece. It is certainly not desirable for the operator to reach past the active cutting tool for purposes of repositioning a hold down device. In a preferred embodiment, each bearing 78 and 134 have a diameter of at least three inches, and preferably about four inches, which will accommodate work pieces of less than 0.25 to approximately 1.50 inches in thickness.

Figure 37:
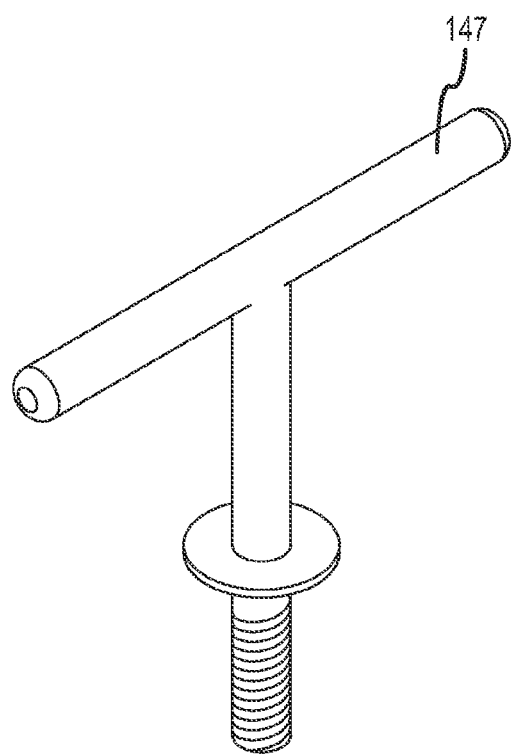
FIG. 37 is a perspective view of one embodiment of a lock down bolt of the present invention.

The dual bearing hold down device 14 may be attached to a table saw 10 through use of a mounting plate 70 shown in FIGS. 31-33B. The mounting plate comprises a channel bracket 142 designed to fit within the channel 144 on the upper surface 146 of the table of the table saw 10, illustrated in FIGS. 1A-2. A pair of parallel outer guide walls 148 are affixed to the channel bracket 142 and, when connected to the table, rest upon the surface 146 of the table with the channel bracket 142 positioned within the channel 144. An aperture 150 is formed in the channel bracket 142 to provide a means of securing the channel bracket 142 to the table and the hold down device 14 to the mounting plate 70. As shown in FIGS. 32B and 33B, the base plate 66 of the dual bearing hold down device 14 nests between the outer guide walls 148 of the mounting plate 70 and is adjustably positionable relative to the guide walls 148 (see arrows in FIG. 32B). Thus, as illustrated in FIGS. 1A-1C, the base plate 66 of the dual bearing hold down device 14 may be moved towards or away from the rip fence 40 to accommodate work pieces of different widths. Once the position of the base plate 66 is selected, its position may be locked down relative to the table surface 146 by use of a lock bolt 147 positioned in a vertical slot 68 formed in the base plate 66 and secured through the aperture 150 in the channel bracket 142. This is illustrated in FIG. 33B. An embodiment of the lock bolt 152 is shown in FIG. 37. With the dual bearing hold down device 14 in place, repetitious cutting of the identified work pieces may be accomplished without repositioning of the device 14.

A different mounting plate, for use with a planer or jointer 140, is shown in FIGS. 29A-30B. Here, the mounting plate 70 is connected to the surface of the jointer 140 and two parallel upstanding guide walls 154 are formed at the outer edges of the mounting plate 70. Apertures 150 are formed in the mounting plate 70 to receive screws or fasteners to secure the mounting plate 70 to the table of the jointer 140. Another aperture receives a lock bolt 147 to secure the base plate 66 relative to the mounting plate 70. As shown in FIG. 29B, the base plate 66 of the dual bearing hold down device 14 is then positioned between the outer guide walls 154 to allow it to be adjustably positioned relative to the guide wall or rip fence 40 of the planer. See, FIG. 3. In one embodiment, when the dual bearing hold down device 14 is used with a jointer/planer 140, the mounting plate 70 is secured to the surface of the table 146 and positions the base plate 66 of the hold down device 14 at an elevated position directly above the cutting blade (unlike the positioning typically used with a table saw). As a result, the base plate 66 of the hold down device 14 may be positioned above and cover a large portion of the cutting blade, thereby preventing the operator's hand from contacting the blade.

Figure 5:
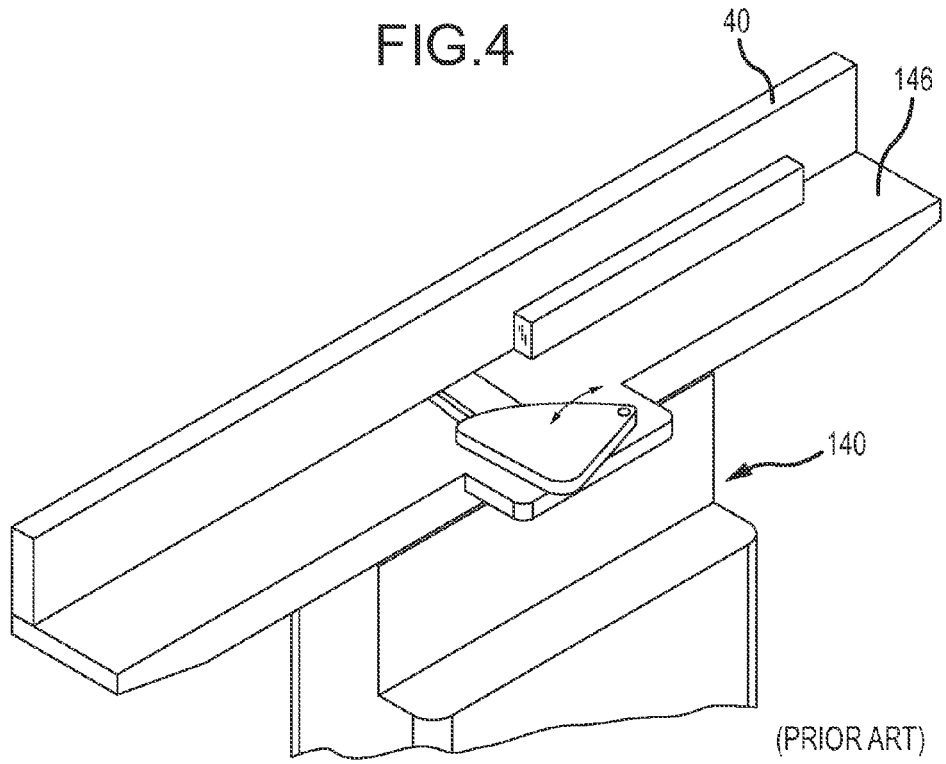
FIG. 5 is a perspective view of a prior art jointer.

A typical jointer/planer 140 is shown in FIG. 5. A rotatable safety plate 156 covers the rotating blade and pivots out of the way as a piece of wood is moved through the cutting zone. However, if an operator's hand were to slip and move into the cutting zone, the safety plate would simply move away as it would with a piece of wood, and nothing would inhibit or prevent the operator's hand from coming in contact with the rotating blade. Embodiments of the present invention substantially reduce this risk.

A left hand hold down device 158 is shown in FIGS. 6 and 34-36. The left hand hold down device 158 may replace the dual bearing hold down device 14 in connection with operating a table saw. The left hand hold down device comprises a base 160 which is pivotally connected to a channel bracket 162. The channel bracket 162 rides within the channel 144 formed in the upper surface 146 of the table of a table saw 10. The channel bracket 162 may comprise different shapes than the rectangular shape shown in the figures provided it functions to maintain the position of the left hold down device relative to the table. The leading edge of the left hand hold down guide includes a series of stepped or staggered surfaces 164 to accommodate work pieces of different thickness. A handle 166 is formed on the upper surface 168 of the base 160 and a safety wall 170 is formed at the forward edge of the base 160. In operation, as shown in FIG. 6, the channel bracket 162 sits within the channel 144 and allows the left hand work piece device 158 to slide within the channel 144 and rotate relative to the channel bracket 162. A lock bolt 147 is positioned and secured to the channel 144 to prevent advancement of the left hand hold down device 158 into the cutting zone such that there is no contact between the left hand device 158 and the cutting blade. The stepped surface 164 provides both a horizontal surface 164 to hold down a work piece and a vertical surface 164 to press the work piece against the rip fence as the work piece is advanced through the cutting zone. The left hand work piece device 158 may pivot or rotate relative to the channel bracket 142 to accommodate work pieces of different widths. In a preferred embodiment, the stepped surfaces 164 are rounded or semi-circular in profile to maintain constant contact with the work piece at any orientation of the left hand hold down device 158 allowing the tool to rotate while the work piece moves through the cutting zone.

Referring now to FIGS. 38-46, an adjustable safety and securing device 170 primarily for miter saws according to various embodiments of the present invention is shown.

Figure 38:
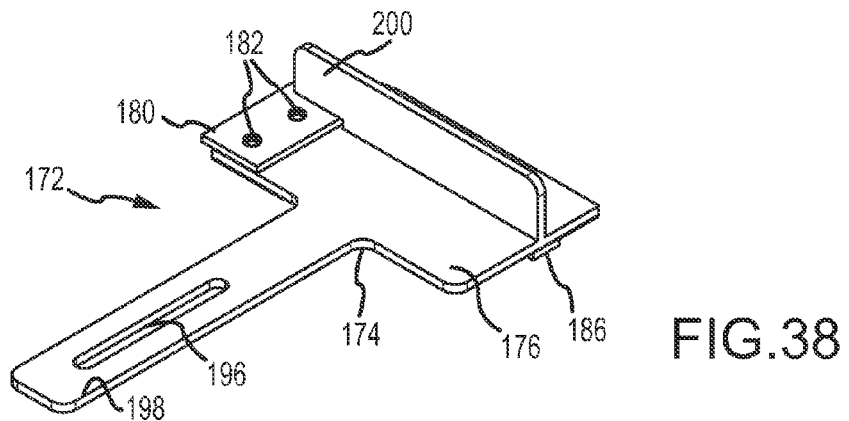
FIG. 38 is a top perspective view of one embodiment of a miter saw hold down device according to the safety system of the present invention.
Figure 39:
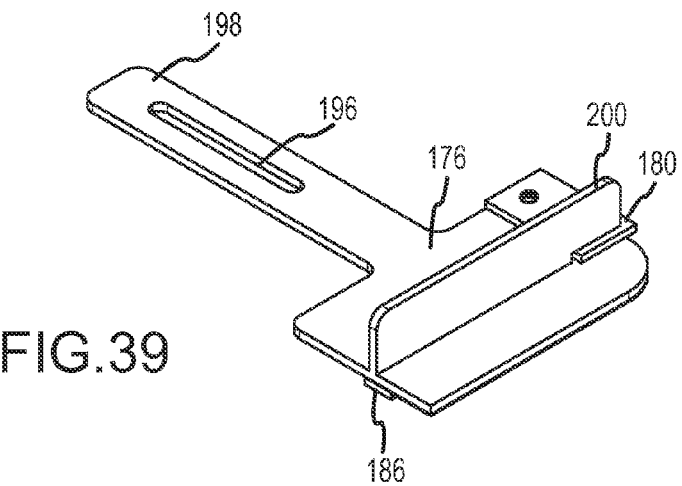
FIG. 39 is an alternative top perspective view of the embodiment of the miter saw hold down device of FIG. 38.
Figure 40:
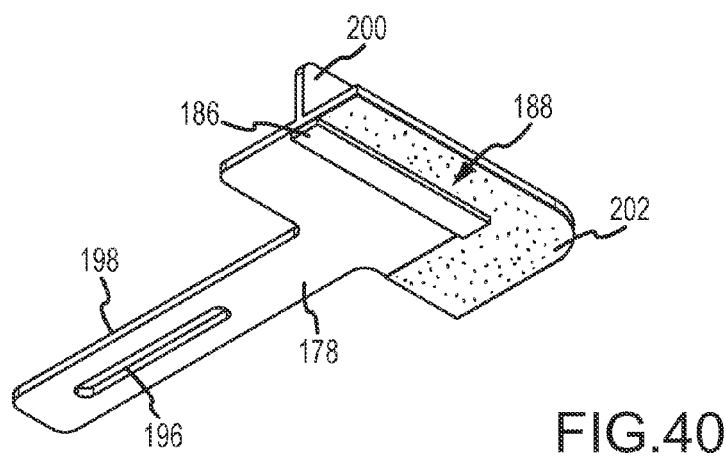
FIG. 40 is a bottom perspective view of the hold down device of FIG. 38.
Figure 41:
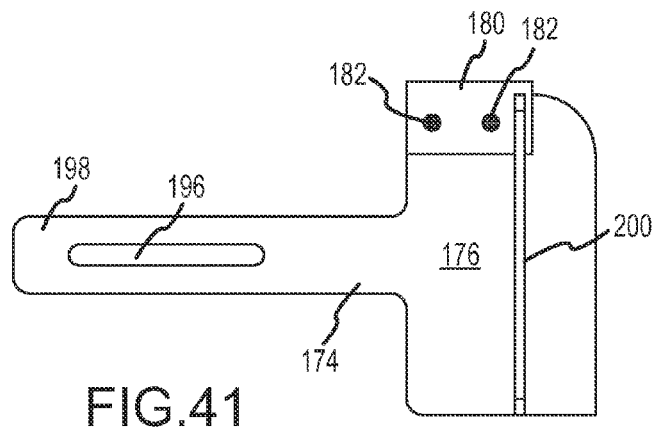
FIG. 41 is a top plan view of the hold down device of FIG. 38.
Figure 42:
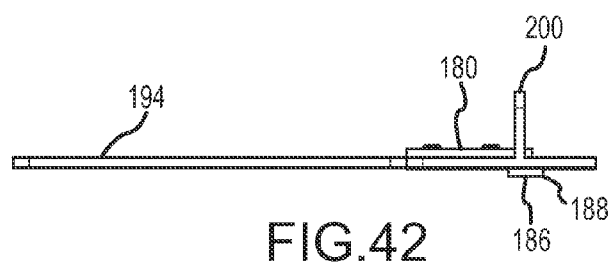
FIG. 42 is a side elevational view of the hold down device of FIG. 38.
Figure 43:
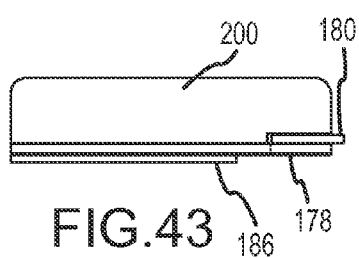
FIG. 43 is an end elevational view of the hold down device of FIG. 38.
Figure 44:
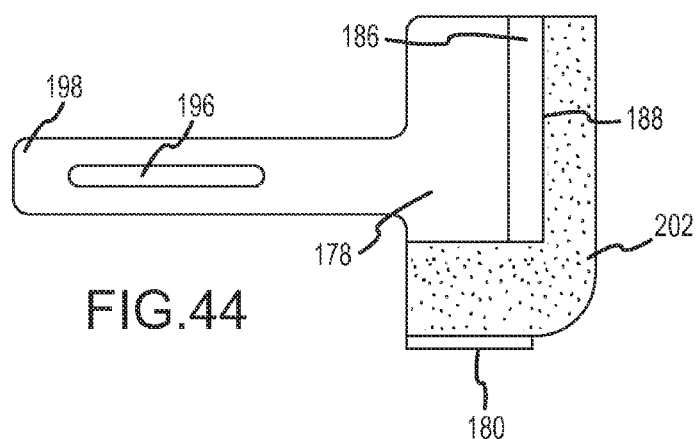
FIG. 44 is a bottom plan view of the hold device of FIG. 38.
Figure 45:
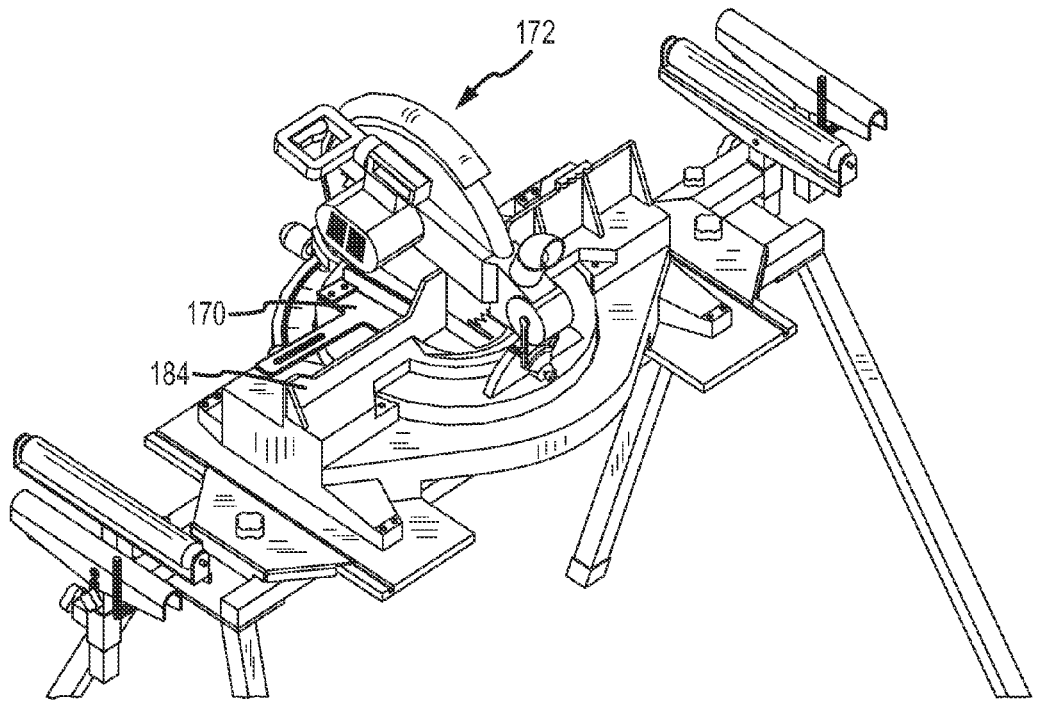
FIG. 45 is a perspective view of the hold down device of FIG. 38 mounted to and used in combination with a miter saw.
Figure 46:
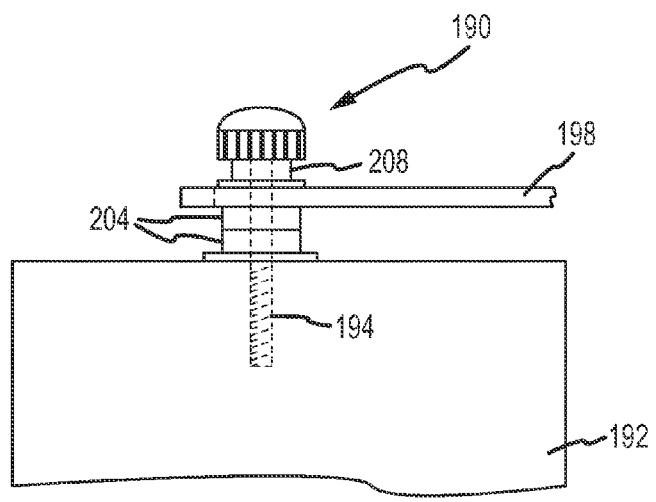
FIG. 46 is a partial elevational view of one embodiment of a lock down mechanism for use with the miter saw hold down device of FIG. 38.
Figure 47:
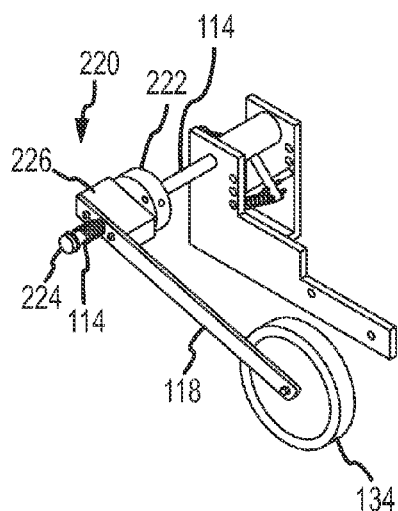
FIG. 47 is a perspective view of an alternative embodiment of an anti-kickback device.
Figure 48:
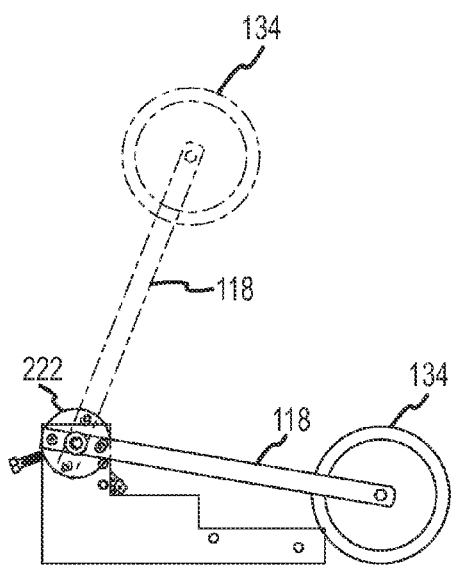
FIG. 48 is a front elevation view of the anti-kickback device of FIG. 47 showing the hold down arm in two alternative positions.
Figure 49:
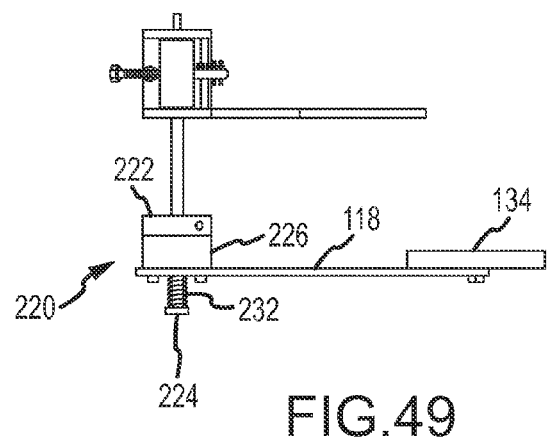
FIG. 49 is a top plan view of the anti-kickback device of FIG. 47.

FIG. 45 is a perspective view of an embodiment of the hold down device 170 mounted on a miter saw 172. FIGS. 38-40 are perspective views of one embodiment of the miter saw hold down device 170. The hold down device 170 comprises a planer body 174, an upper surface 176 and a lower surface 178. As best shown in FIGS. 38 and 41, an alignment plate 180 is adjustably secured to the planar body 174 by alignment screws 182, positioned in adjustment slots, and squarely aligns the planer body 174 with the guide rail 184 of the saw 172. As shown in FIGS. 42-44, guide member 186 extends from the lower surface 178 and provides a guide surface 188 which abuts and assists in aligning the work piece for a desired cut. The guide member 186 comprises a substantially straight edge or surface for contacting a work piece. The guide member 186 prevents the work piece from rotating or moving laterally away from the saw blade while the surface 178 prevents the work piece from moving upwardly relative to the table surface and the guide rail 184 prevents the work piece from moving longitudinally in the direction of the saw blade. The alignment plate 180 can be positioned such that the guide surface 188 of the guide member 186 is parallel to the blade, or it may be positioned such that the guide surface 188 is positioned at a desired angle relative to the blade to make a particular cut.

As shown, the hold down device 170 is secured in place relative to the saw and is positioned such that safe cutting of the work piece is enabled. The hold down device 170 comprises lock means 190 for securing one end of the hold down device 170 to the base or frame 192 of the saw by means of a threaded post 194 secured to the frame 192 and extending through a slot 196 formed in a positioning arm 198. The lower surface 178 of the hold down device 170 rests on an upper surface of the work piece and the guide member 186 is provided on the lower surface 178 such that one edge or surface of the work piece is aligned with and engaged by the rigid member 186. The alignment member 180 is used to align the guide member 186 parallel to the saw blade when the saw blade is positioned at 90 degrees, or at a different angle as may be desired. The hold down device 170 further comprises a safety wall 200 extending upwardly and generally perpendicular to the upper surface 176 of the planar body 174. The safety wall 200 prohibits a user's hand or fingers from contact with the saw blade should the user's hand slip or the work piece kick back.

When the hold down device 170 is aligned to a desired position, the work piece may be secured by applying a downward force upon the upper surface 176 of the hold down device by the operator's left hand to limit or prevent movement of the work piece and the hold down device. As shown in FIG. 44, at least a portion of the lower surface 178 of the hold down device 170 is provided with non-slip material 202, such as sandpaper or rubber, to engage the work piece and limit movement of a work piece. Any number of materials and features including, but not limited to rubber, knurled features, protrusions, etc. may be provided to assist in gripping the work piece.

Use of the hold down device significantly improves the versatility of a miter saw, allowing it to make precise cuts on relatively small work pieces that would previously not be attempted. Cutting a relatively small sized work piece would normally place the operator's hand dangerously close to the saw. However, the present embodiment removes these concerns and protects the operator's hand and fingers. In order to make second or additional cuts, or cuts of a different orientation, including cuts of small work pieces, the saw and/or the hold down device 170 may be re-orientated. For example, the hold down device 170 may be angled with respect to the saw blade and/or the guide fence 184. This may be accomplished, for example, by loosening the lock means 190, angularly adjusting the hold down device 170, and re-securing the lock means 190. The hold down device 170 may also be translated laterally along a path defined by the slot 196 to move the device 170 away from or closer to the blade. As shown in FIG. 45, the position of the hold down device 170 may be adjusted to accommodate work pieces of different thicknesses. Spacers 204 may be positioned on the threaded post 194 below the positioning arm 198. A washer 206 may be positioned underneath the lock nut 208 to provide a better grip for the lock nut 208.

In yet a still further embodiment, a handle may be located in the upper surface 176 to further assist a user in applying force for securing and/or moving the hold down device 170. For example, it is contemplated that a joy-stick-type handle or protrusion be provided projecting upwardly from the upper surface 176. Such a handle is provided for both indicating a safe location for a user's hand(s), as well as facilitating the application of force through an ergonomic feature.

Among the various advantages and benefits of the miter saw hold down device, including the aforementioned safety advantages, is the ability to produce a series of cuts at varying angles, even where the length of such cuts is/are small. The present invention provides a device which allows for freedom of angular movement of a work piece in additional to angular adjustment features provided by a known device, such as a miter saw, thereby vastly improving the versatility of a miter saw.

FIGS. 47-51 disclose an alternative embodiment of an anti-kickback device 16. The embodiment described in connection with FIGS. 23-28 remains essentially the same, but a quick release positioning mechanism 220 has been added. The quick release positioning mechanism 220 is positioned between the shaft 114 and arm 118. The quick release positioning mechanism 220 comprises a first body member 222 affixed to a portion of the shaft 114. In this embodiment, the first body member 222 is disk shaped, although other shapes may be used as will be appreciated by those skilled in the art. The shaft 114 extends through a center aperture in the first body member 222 and terminates in an enlarged end or cap 224. The first body member 222 is fixed to and moves with the rotation of the shaft 114. The quick release positioning mechanism 220 further comprises a second body member 226. In this embodiment, the second body member 226 is block shaped and includes a center aperture through which the shaft 114 also extends. Unlike the first body portion 222, the second body portion 226 is not secured to the shaft 114 other than by virtue of the shaft extending through an aperture in the second body portion 226. The arm 118 is secured to the second body member 226 by a pair of screws or by other means known to those of skill in the art.

Figure 50:
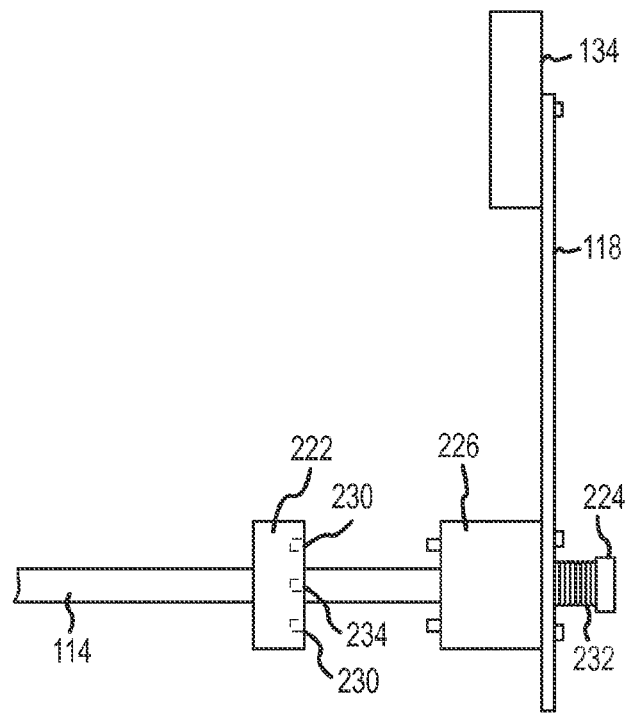
FIG. 50 is a partial top plan view of the anti-kickback device of FIG. 47 showing the first body member of a quick release positioning mechanism separated from the second body member.
Figure 51:
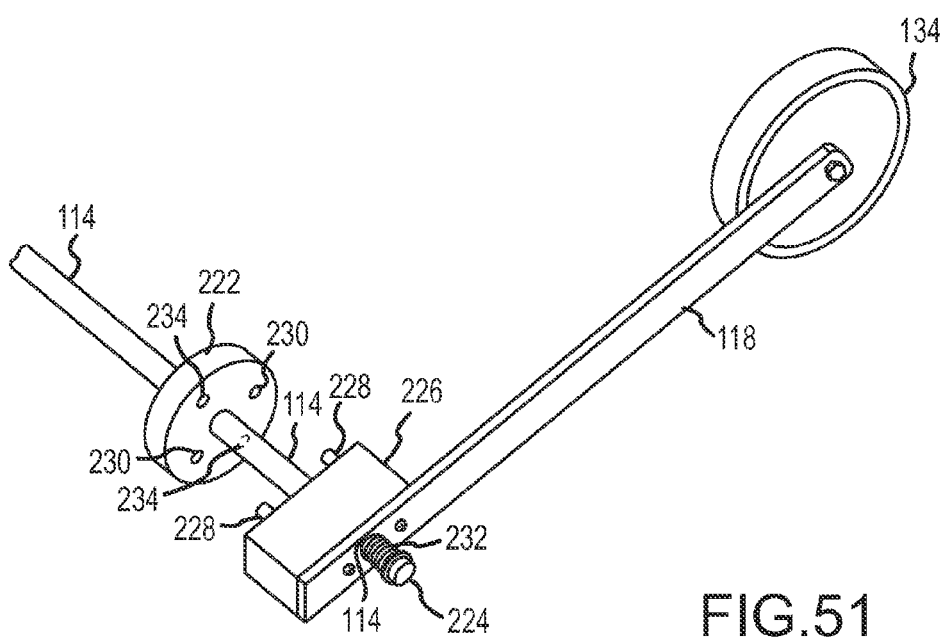
FIG. 51 is a perspective view of the embodiment shown in FIG. 50.

As shown in FIGS. 50, 51, the second body member 226 includes a plurality of pins 228 that extend laterally out of the second body member 226 and engage receptively configured apertures 230 in the first body member 222. When the pins 228 are secured in the apertures 230, the shaft 114 and arm 118 move in unison. A spring 232 positioned between the arm 118 and cap 224 force the second body member 226 toward the first body member 222. In this manner, the pins 228 remain engaged within the apertures 230 and the first and second body members are secured together and move in unison. If it is desired to position the hold down wheel 134 at a position spaced from the work piece and out of the way, the second body member 226 is moved laterally outwardly against the force of the spring 224 to remove the pins 228 from apertures 230. The second body member 226, arm 118 and wheel 134 are then rotated upwardly until the pins 228 align with apertures 234. The pins 228 are then nested in the apertures 234 by the action of the spring 232 to hold the arm 118 and hold down wheel 134 in a position spaced from the work piece and out of the way.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

While various embodiments of the safety system present invention have been described in detail, it is apparent that modifications and alterations of those embodiments will occur to those skilled in the art. However, it is to be expressly understood that such modifications and alterations are within the scope and spirit of the present invention. In addition, it should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein. Other modifications or uses for the present invention will also occur to those of skill in the art after reading the present disclosure. Such modifications or uses are deemed to be within the scope of the present invention.

What is claimed is:

1. An anti-kickback device for use with a powered cutting tool having a rotating cutting element for cutting a work piece, a table having at least one surface for supporting a work piece prior during and after cutting, and a guide fence having a second surface oriented perpendicular to the at least a one surface of the at least one table, comprising:
- a. a mounting plate configured to be secured to the table proximate the rotating cutting element and configured to permit adjustment of the position of the mounting plate relative to the cutting element;
- b. a base secured to the mounting plate, the base adjustably positionable relative to the mounting plate to permit the base to move toward and away from the guide fence;
- c. a first bearing assembly pivotally affixed to the base for applying pressure against a first surface of a work piece to push the work piece against the guide fence, the first bearing assembly comprising a first elongate bearing arm having a first portion and a second portion, a first bearing member disposed at the end of the first portion opposite the second portion and having a first bearing pivot about which the first bearing rotates relative to the first portion, the first bearing member for engaging a work piece, a first bearing arm pivot disposed in the first portion and about which the first bearing arm pivots relative to the base, and first adjustable biasing means connected between the base and the first elongate bearing arm whereby the first bearing member applies a first force against a first surface of the work piece at an acute angle relative to the first surface of the work piece surface;
- d. a second bearing assembly pivotally affixed to the base for applying pressure against a second surface of the work piece to push the work piece against the at least one surface of the table and not against the guide fence, the second bearing assembly comprising a second elongate bearing arm having a first portion and a second portion, a second bearing member disposed at the distal end of the first portion for engaging the work piece, the second bearing member having a second bearing pivot about which the second bearing member rotates relative to the second elongate bearing arm, a second bearing arm pivot associated with the second elongate bearing arm and about which the second elongate bearing arm pivots relative to the base, and second adjustable biasing means whereby the second bearing member applies a second force against a second surface of the work piece in a direction perpendicular to the force applied by the first bearing member; and
- e. the absence of any bearing members positioned following the rotating cutting element for applying pressure against the work piece in a direction toward the rotating cutting element.

2. The anti-kickback device of claim 1, further comprising a third bearing assembly pivotally affixed to the base for applying pressure against the first surface of the work piece to push the work piece against the guide fence, the third bearing assembly comprising a third elongate bearing arm having a first portion and a second portion disposed at an angle relative to the first portion, a third bearing member disposed at the end of the first portion opposite the second portion for engaging a work piece and having a third bearing member pivot about which the third bearing pivots relative to the first portion, a third bearing arm pivot associated with the third bearing arm disposed in the first portion and about which the third bearing arm pivots relative to the base, and third adjustable biasing means connected between the base and the third bearing arm whereby the third bearing member applies a third force against a surface of the work piece at an acute angle relative to the surface.

3. The anti-kickback device of claim 1, wherein the first and second bearing arms are removable from the base.

4. The anti-kickback device of claim 1, wherein a channel is formed in the at least one surface, and the mounting plate comprises a member that seats within the channel and is repositionable within the channel.

5. The anti-kickback device of claim 1, wherein the base comprises a linear slot oriented parallel to the axis of rotation of the cutting element and further comprising a lock member positioned in the slot to secure the position of the base at multiple positions relative to the mounting plate.

6. The anti-kickback device of claim 1, wherein the powered cutting tool has a forward end and a rearward end, wherein the forward end is defined as the end from which the work piece is introduced to the cutting element and the rearward end is defined as the end towards which the work piece exits the cutting element, and wherein the first bearing arm pivot is positioned forward of the first bearing member pivot.

7. The anti-kickback device of claim 1, wherein the first portion and second portion of the first bearing arm are substantially co-planar.

8. The anti-kickback device of claim 2, wherein the first portion and second portion of the first bearing arm and the first portion and second portion of the third bearing arm are substantially co-planar.

9. The anti-kickback device of claim 1, further comprising multiple connection points disposed on the second portion of the first bearing arm for interconnection with the first adjustable biasing means, wherein each connection point causes the first adjustable biasing means to apply a different force to the first bearing member.

10. The anti-kickback device of claim 2, further comprising multiple connection points disposed on the second portion of the third bearing arm for interconnection with the third adjustable biasing means, wherein each connection point causes the third adjustable biasing means to apply a different force to the third bearing member.

11. The anti-kickback device of claim 1, wherein the first force applied by the first bearing member has a first component force that is applied perpendicular to the first surface and a second component opposing advancement of the work piece toward the cutting element.

12. The anti-kickback device of claim 2, wherein the third force applied by the third bearing member has a first component force that is applied perpendicular to the first surface and a second component opposing advancement of the work piece toward the cutting element.

13. The anti-kickback device of claim 1, wherein the powered cutting tool is at least three of a table saw, jointer, router, and shaper.

14. The anti-kickback device of claim 1, wherein the first surface and second surface are not parallel.

15. The anti-kickback device of claim 1, wherein the first direction is vertical and the second direction is horizontal.

16. The anti-kickback device of claim 1, wherein the first bearing means and the first biasing assembly and the second bearing assembly are positioned on the opposite side of the cutting element from the guide fence.

17. The anti-kickback device of claim 1, further comprising a stop member associated with the body to define one limit of the rotational position of the first bearing arm.

18. The anti-kickback device of claim 1, further comprising the first portion and second portion of the first elongate bearing arm are oriented in a non-parallel relationship.

19. The anti-kickback device of claim 1, wherein both the first portion and second portion of the first elongate bearing arm are adapted to connect to the first adjustable biasing means.

20. The anti-kickback device of claim 1, wherein both the first portion and second portion of the third elongate bearing arm are adapted to connect to the third adjustable biasing means.

21. The anti-kickback device of claim 2, wherein the second bearing member is positioned relative to the first and third bearing members to engage a work piece between the locations at which the first and third bearing members engage the same work piece.

22. An anti-kickback device for use with a powered cutting tool having a rotating cutting element for cutting a work piece, a horizontal table having at least one surface for supporting a work piece prior during and after cutting, and a guide fence having a second surface oriented perpendicular to the at least a one surface of the at least one table, comprising:
   a. a mounting plate secured to the table proximate the rotating cutting element;
   b. a base secured to the mounting plate, the base remaining substantially horizontal and being positionable relative to the mounting plate to permit the base to move toward and away from the guide fence;
   c. a first bearing assembly secured to the base for applying pressure against a first surface of a work piece to push the work piece against the guide fence, the first bearing assembly comprising (i) a first elongate bearing arm (ii) a first bearing member disposed at a distal end of the first elongate bearing arm for engaging the work piece (iii) a first bearing pivot extending substantially vertically and the first elongate bearing arm rotating substantially horizontally about said first bearing pivot (iv) a first adjustable biasing means connected between the base and the first elongate bearing arm, wherein the first bearing member applies a substantially horizontal force against a first surface of the work piece;
   d. a second bearing assembly secured to the base and offset from the first bearing assembly, the second bearing assembly for applying pressure against a second surface of the work piece to push the work piece against the at least one surface of the table and not against the guide fence, the second bearing assembly comprising (i) a rotatable shaft extending substantially horizontal (ii) a second elongate bearing arm attached to said rotatable shaft (iii) a second bearing member disposed at a distal end of said second elongate bearing arm, the second elongate bearing arm for engaging the work piece and rotating substantially vertically about said rotatable shaft, (iv) a second adjustable biasing means connected between said base and said second elongate bearing arm wherein the second bearing member applies a substantially vertical force against the second surface of the work piece and therefore in a direction substantially perpendicular to the force applied by the first bearing member.

\* \* \* \* \*